United States Patent [19]

Tanaka et al.

[11] Patent Number: 5,112,148
[45] Date of Patent: May 12, 1992

[54] ELECTRONIC TYPEWRITER WITH OVERRIDE OF SPELLING-CHECKING FUNCTION

[75] Inventors: Koki Tanaka; Yoshikazu Heshiki; Takeshi Nakayama, all of Shizuoka, Japan

[73] Assignee: Tokyo Electric Co., Ltd., Tokyo, Japan

[21] Appl. No.: 640,570

[22] Filed: Jan. 14, 1991

Related U.S. Application Data

[63] Continuation of Ser. No. 488,394, Feb. 27, 1990, abandoned, which is a continuation of Ser. No. 211,457, Jun. 12, 1988, abandoned.

[30] Foreign Application Priority Data

| Jun. 27, 1987 | [JP] | Japan | 62-160131 |
| Jun. 27, 1987 | [JP] | Japan | 62-160132 |
| Jun. 27, 1987 | [JP] | Japan | 62-160136 |
| Jun. 27, 1987 | [JP] | Japan | 62-160139 |
| Jun. 27, 1987 | [JP] | Japan | 62-160140 |

[51] Int. Cl.[5] .................................... G06F 7/04
[52] U.S. Cl. .................................... 400/63; 364/943.41
[58] Field of Search .............. 400/63, 74, 695, 697.1; 364/943.41

[56] References Cited

U.S. PATENT DOCUMENTS

| 4,225,393 | 9/1980 | Abe | 400/279 |
| 4,330,212 | 5/1982 | Churgovich | 400/64 |
| 4,564,301 | 1/1986 | Ueno | 400/63 |
| 4,671,684 | 6/1987 | Kojima | 400/63 |
| 4,689,768 | 8/1987 | Heard | 400/63 |
| 4,775,251 | 10/1988 | Suzuki | 400/63 |
| 4,782,464 | 11/1988 | Gray | 364/900 |
| 4,783,761 | 11/1988 | Gray | 364/900 |

FOREIGN PATENT DOCUMENTS

| 156289 | 9/1982 | Japan | 400/697.1 |
| 61-75470 | 4/1986 | Japan | 400/63 |
| 61-90258 | 5/1986 | Japan | 400/63 |
| 61-157967 | 7/1986 | Japan | 400/63 |
| 61-157968 | 7/1986 | Japan | 400/63 |

OTHER PUBLICATIONS

IBM Technical Disclosure Bulletin, No. 88 vol. 22, Jan. 1980 pp. 3760, 400-315.

Primary Examiner—David A. Wiecking
Assistant Examiner—Steven S. Kelley
Attorney, Agent, or Firm—Frishauf, Holtz, Goodman & Woodward

[57] ABSTRACT

An electronic typewriter comprises a printing head, a carriage on which the printing head is movable along along a printing line, a keyboard including various keys, a carriage pointer for indicating the position at which the carriage is presently located, a line buffer having sequential memory locations corresponding to printing positions on the printing line, and a control circuit for performing a character key processing when a character key is operated and a space key processing when a space key is operated. In the electronic typewriter, the control means is constructed so as to perform a carriage return processing when a carriage return key is operated, in which processing the spelling of such a word is checked that one of the characteristic codes forming the word or a space code following the word is stored in a memory location of said line buffer specified by the carriage pointer, the carriage and carriage pointer are retuned to a predetermined home position thereafter, and the returning of carriage and carriage pointer is omitted when an error is detected in the spelling check.

18 Claims, 20 Drawing Sheets

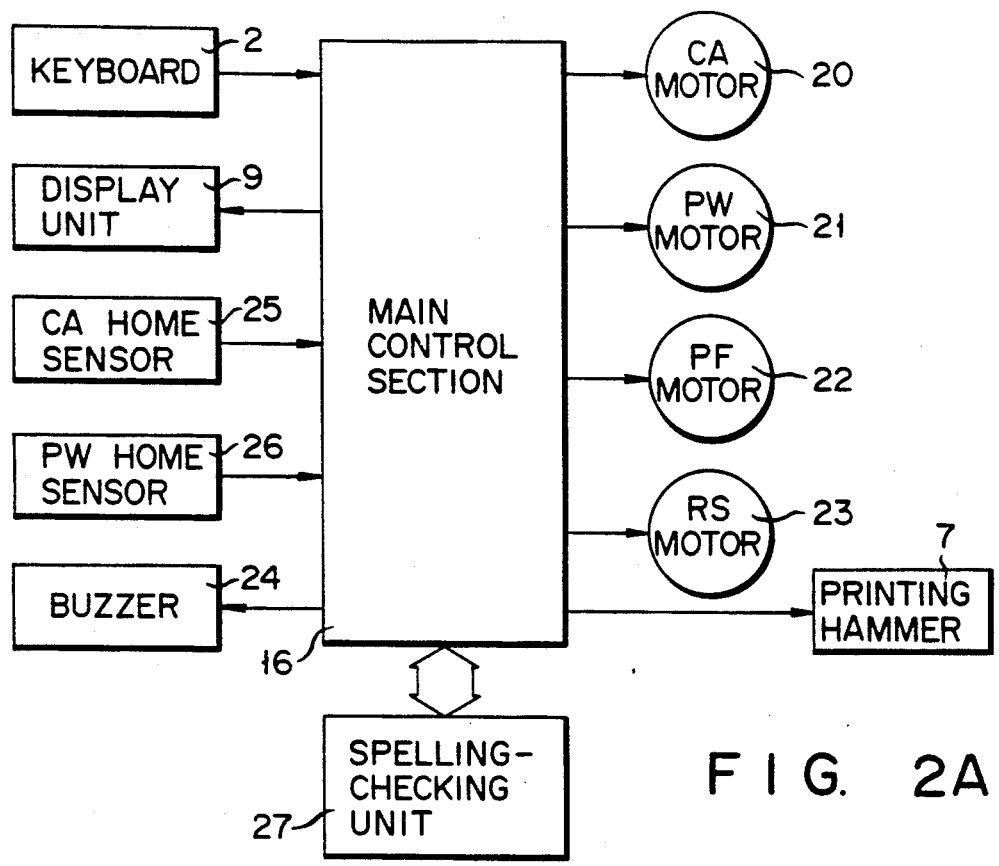
FIG. 2A
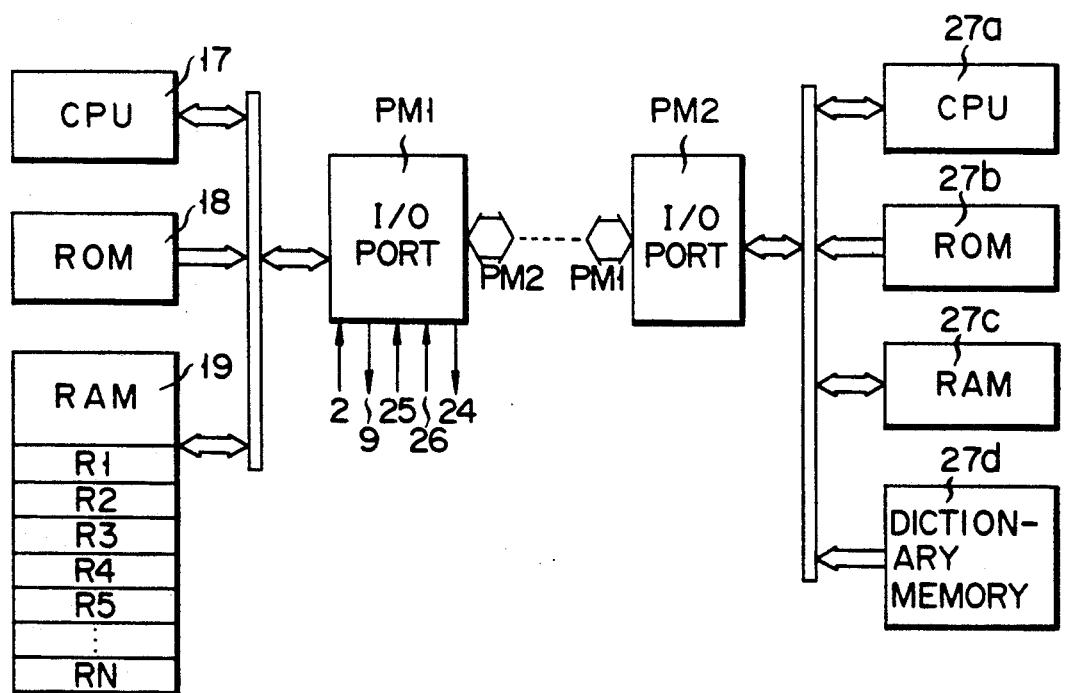
FIG. 2B
FIG. 2C

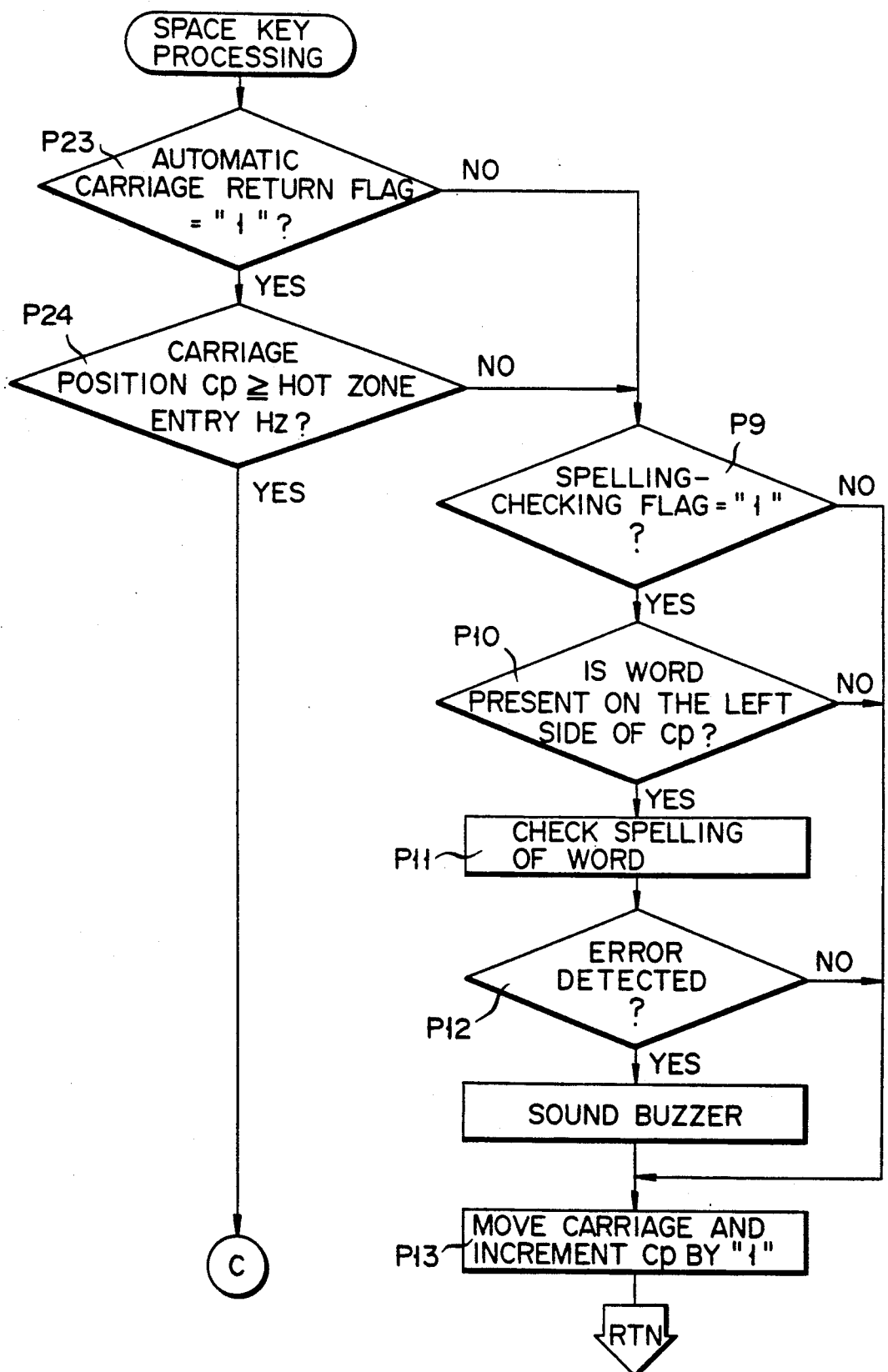
F I G. 11A

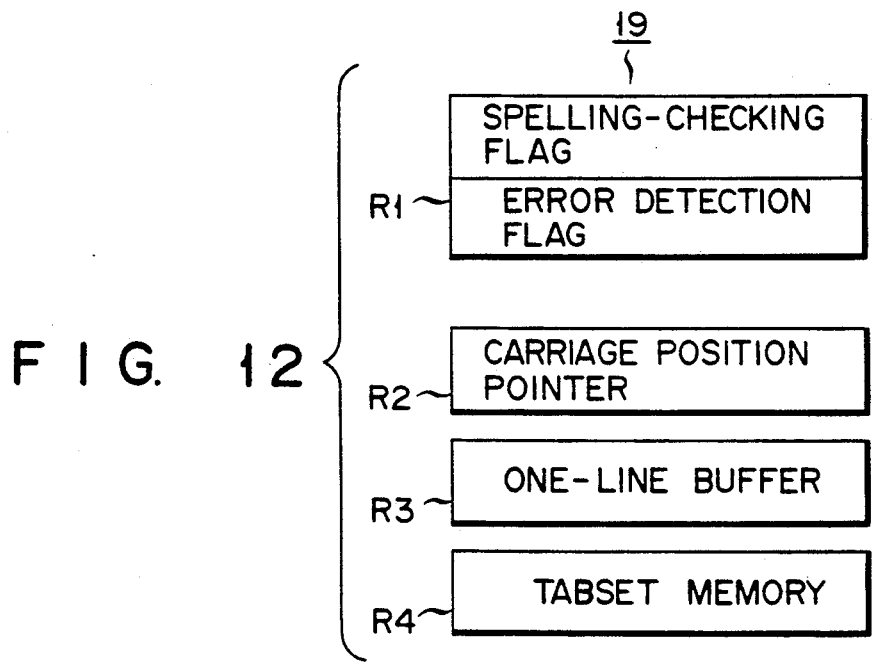
F I G. 12
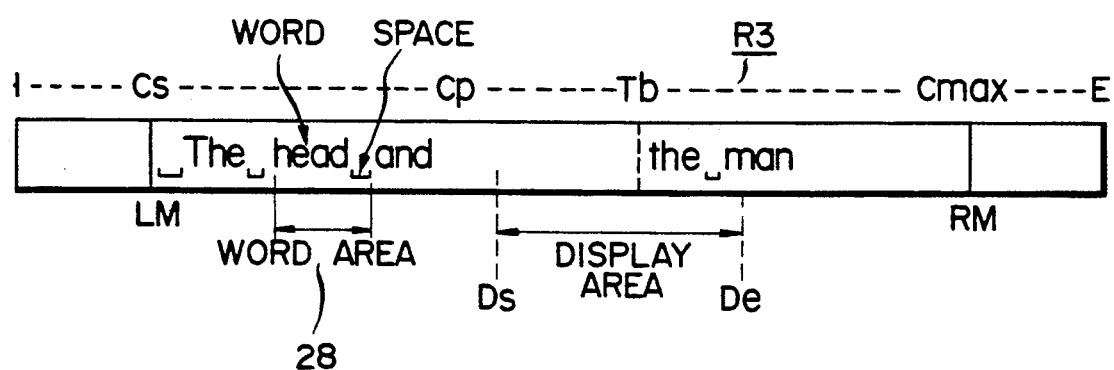
F I G. 13

ELECTRONIC TYPEWRITER WITH OVERRIDE OF SPELLING-CHECKING FUNCTION

This application is a continuation, of application Ser. No. 07/488,394, filed Feb. 27, 1990, now abandoned.

BACKGROUND OF THE INVENTION

1. Field of the Invention

This invention relates to an electronic typewriter having a function of checking the spelling of a word input by an key operation, and more particularly to an electronic typewriter having a function of checking the spelling of a word in response to a space key, a carriage return (CR) key operation or the like.

2. Description of the Related Art

In general, a spelling checking unit having a dictionary memory which stores the correct spellings of words to be input by key operations is provided in an electronic typewriter with a spelling-checking function. When a space key is operated after a character key or keys on a keyboard are operated to enter a word, the spelling of the word input immediately before the operation of the space key is checked. In this case, if an error is detected in the spelling, an alarm such as buzzer sound is generated, for example. When the typist hears the alarm sound, the typist determines the misspelled word which has been input and printed by the key operation, moves back the carriage to the position of the misspelled word, and then corrects the misspelled word.

Further, in an ordinary electronic typewriter, when the carriage has reached a position at or near the right margin provided at the end portion of each line, a carriage return key is operated to move the carriage back to a home position and change lines. In this case, the carriage return key (CR) is operated without operating the space key after the operation of inputting a final word, and at this time the spelling of the word input immediately before the operation of the carriage return key is checked in response to the operation of the carriage return key. That is, when the carriage return key is operated, the spelling of the word input immediately before the operation of the carriage return key is checked and then the carriage return operation is effected.

However, the electronic typewriter with the spelling-checking function has the following problems. As described before, when the carriage return key is operated, the spelling of the word input immediately before the operation of the carriage return key is checked and then the carriage return operation is automatically effected. If the misspelling is detected in the key-in word, a buzzer sound is generated. Although the buzzer sound is generated only for a short period of time, the carriage is set on the printing starting position or the left end of the next line when the typist has heard the buzzer sound.

Therefore, in a case where the misspelling is detected and the misspelled word is corrected, it is necessary to set back the carriage return on the former line by operating a reverse index key or the like, and then move it back to the position of the word printed near the right margin by operating a space key, back space key or the like.

Thus, the word correction operation becomes extremely complicated, lowering the operability of the electronic typewriter in its entirety.

Further, the operations of checking the spellings started in response to the operations of the carriage return key and the space key are effected under the same operating condition. That is, only if the carriage return key or space key is operated when the carriage is positioned on the right side of the printed word, the spelling of the word is checked.

When, for example, a last word on a line is misspelled, the carriage is first set on a wrong letter or character of the misspelled word, and the misspelled word is corrected. At this time, in order to check the spelling of the corrected word, it is necessary to set the carriage next to the right side of the corrected word by operating the space key or the like and then operate the carriage return key.

Further, there is a possibility that a word other than the last word on a line is corrected after which additional words of the line are input, and then the carriage return key is operated to change lines. In this case, the spelling of the corrected word is not checked. That is, the spellings of all the input words cannot always be checked.

SUMMARY OF THE INVENTION

An object of this invention is to provide an electronic typewriter with a spelling-checking function in which the spelling-checking can be effected by operating the carriage return key even when the carriage is set on a word, and in this case, the carriage return operation is inhibited when an error is detected in the spelling-checked word, so that the spelling-checking operation can be effected at a high reliability by operating the carriage return key, a correction operation for the misspelled word can be easily effected and the operability of the keys can be greatly enhanced.

The above object can be attained by an electronic typewriter which comprises a printing head, a carriage on which a printing head is mounted and which is moved along a printing line, a carriage printer for indicating the position at which the carriage is presently located, a buffer memory including sequential memory locations corresponding to printing positions on the printing line, a keyboard including character keys, a space key, and a carriage return key, and a control circuit for performing a first processing when it is detected that one of the character keys is operated, in which processing a character code corresponding to the character key is stored into a memory location of the buffer memory specified by the carriage pointer, the printing head is allowed to print a character corresponding to the character code, and the carriage and carriage pointer are forwarded to the next printing position thereafter, a second processing when it is detected that the space key is operated, in which processing a space code is stored in a memory location of the buffer memory specified by the carriage pointer, the spelling of a word is checked which is located immediately before the space code is checked, and the carriage and carriage pointer are forwarded to the next printing position thereafter, and a third processing when it is detected that the carriage return key is operated, in which processing the spelling of such a word is checked that one of the character codes forming the word or a space code following the word is stored in a memory location of the buffer memory specified by the carriage pointer, the carriage and carriage pointer are returned to a predetermined home position thereafter, and the returning operation of the carriage and carriage pointer is omitted when an error is detected in the spelling check.

BRIEF DESCRIPTION OF THE DRAWINGS

FIG. 2A is a diagram schematically showing a control circuit of the electronic typewriter shown in FIG. 1;

FIG. 2B is a diagram showing the detail construction of the main control section of FIG. 2A;

FIG. 2C is a diagram showing the detail construction of the spelling-checking unit of FIG. 2A;

FIGS. 10A to 11B are flowcharts illustrating the operation of the control circuit used in the second embodiment;

FIG. 12 is a block diagram showing main memory areas contained in the RAM used in an electronic typewriter according to a third embodiment;

FIG. 13 is a diagram showing the detail construction of a one-line buffer in the third embodiment;

DETAILED DESCRIPTION OF THE PREFERRED EMBODIMENTS

There will now be described an embodiment of this invention with reference to the accompanying drawings.

Figure 1:
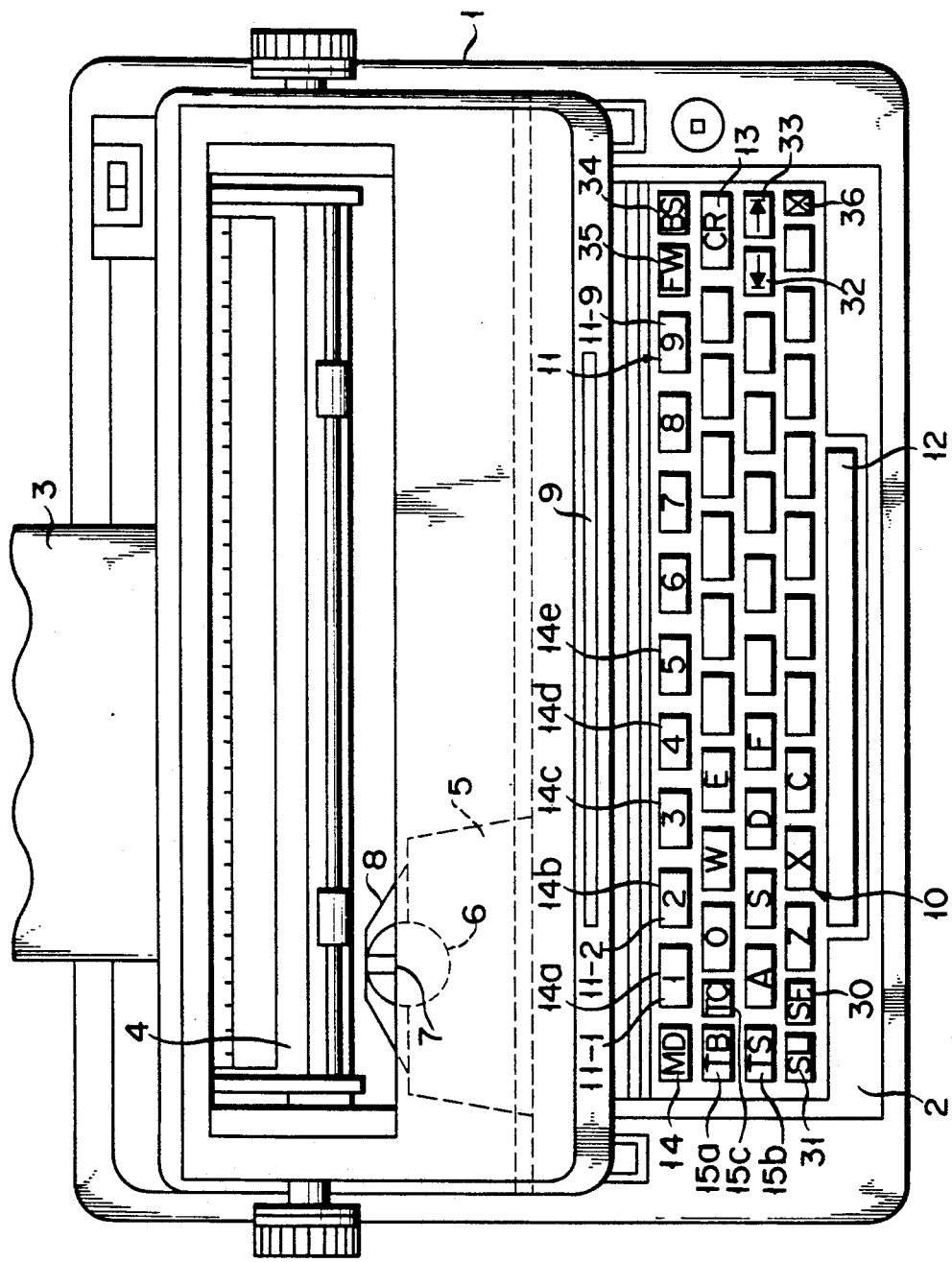
FIG. 1 shows an electronic typewriter with the spelling-checking function according to one embodiment of this invention.

FIG. 1 is a plan view showing an appearance of an electronic typewriter with a spelling-checking function according to one embodiment of this invention. The electronic typewriter includes casing 1, keyboard 2 arranged on the front portion of casing 1, and platen 4 which is mounted inside casing 1 to hold printing paper in printing position. A shaft (not shown) is mounted in parallel with platen 4, and carriage 5 is mounted on the shaft and is driven in the axial direction of platen 4. Printing wheel 6 including spokes having types on their respective end portions, printing hammer 7 for striking the type of printing wheel 6 against printing paper 3 set on platen 4, printing ribbon 8 received in a cassette, and motors for driving the above elements are mounted on carriage 5.

Further, display 9 constituted by liquid crystal elements for displaying one line of character data entered by operating keys on keyboard 2 is provided on that portion of casing 1 which locates above keyboard 2.

As shown in FIG. 1, keyboard 2 includes ordinary keys used in an ordinary electronic typewriter such as alphabet keys 10, numeral keys 11, space key 12, carriage return (CR) key 13, shift key 30 and shift lock key 31. Further, various function keys such as selection key 14 used in combination with one of numeral keys 11, left margin key 32, right margin key 33, tab key 15a, tab-set key 15b, tab clear key 15c, back space key 34, forward key 35 and correction key 36 are additionally provided on keyboard 2. Space key 12, carriage return key 13, and tab key 15a are examples of carriage-movement control keys, or control keys, so called because by operating them motion of carriage 5 is actuated.

For example, a combination of mode key 14 and numeral key 11-1 serves as spelling-checking selection key 14a, and a combination of mode key 14 and numeral key 11-2 serves as automatic carriage return key 14b.

FIG. 2A is block diagram schematically showing the control circuit of the electronic typewriter. The electronic typewriter includes main control section 16 for performing control required for the printing operation and spelling-checking unit 27 for performing the spelling-checking operation. As shown in FIG. 2B, control section 16 includes CPU 17, ROM 18, RAM 19, and input/output port PM1. Control section 16 is connected to keyboard 2 and display 9. Control section 16 performs control operations in response to various key signals generated from keyboard 2 so as to control the operations of carriage motor 20 for driving carriage 5, printing wheel motor 21 for rotating printing wheel 6, paper feed motor 22 for rotating platen 4 to feed printing paper 3, ribbon feed motor 23 for feeding printing ribbon 8, printing hammer 7 and buzzer 24. Further, control section 16 is connected to receive detection signals from carriage home position detection sensor 25 for detecting that carriage 5 is set at a reference position (home position) set at the left end position of platen 4, and printing wheel home position detecting sensor 26 for detecting that printing wheel 6 is set at a reference rotation position. Control section 16 is connected to spelling-checking unit 27, which is well known in the art, for checking the spelling of a word entered by key operation on keyboard 2.

Spelling-checking unit 27 includes, as shown in FIG. 2C, a microcomputer constituted by CPU 27a, ROM 27b, RAM 27c document memory 27d and I/O port PM2. When a word formed of a plurality of character data is supplied from control section 16 to spelling-checking unit 27, CPU 27a stores the word data into RAM 27c, compares the word data, for each character, with various correct words read out from dictionary memory 27d, and determines whether each letter or character constituting the word data is correct or not. Then, the result of the spelling-checking is transferred to control section 16.

Figure 3:
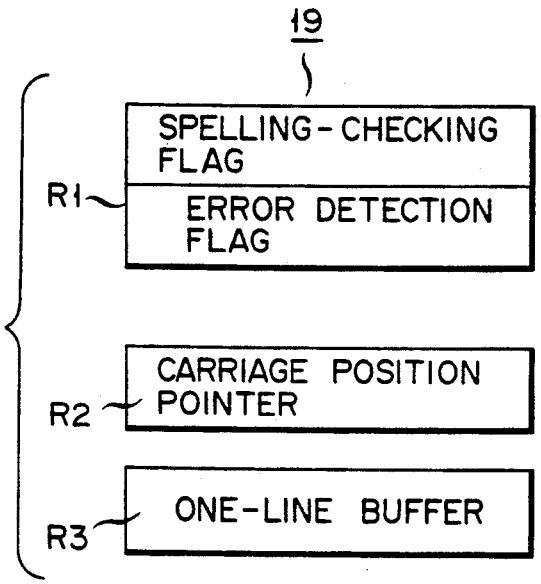
FIG. 3 is a block diagram showing main memory areas contained in the RAM shown in FIG. 2B.

As shown in FIG. 3, memory areas R1 serving as a flag register, memory area R2 serving as a pointer register, memory area R3 serving as a one-line buffer and memory areas R4 to RN are provided in RAM 19. Flag register R1 stores flags such as a spelling-checking flag indicating that the "spelling-checking" mode is selected by means of spelling-checking selection key 14a and an error detection flag indicating that a spelling error is detected in the spelling-checking process effected in response to the operation of carriage return key 13. Pointer register R2 is used to store carriage position Cp indicating the present position of carriage 5. One line buffer R3 is used to store character data of one line entered by key operation, and memory areas R4 to RN are used to store various data for various processings.

Figure 4:
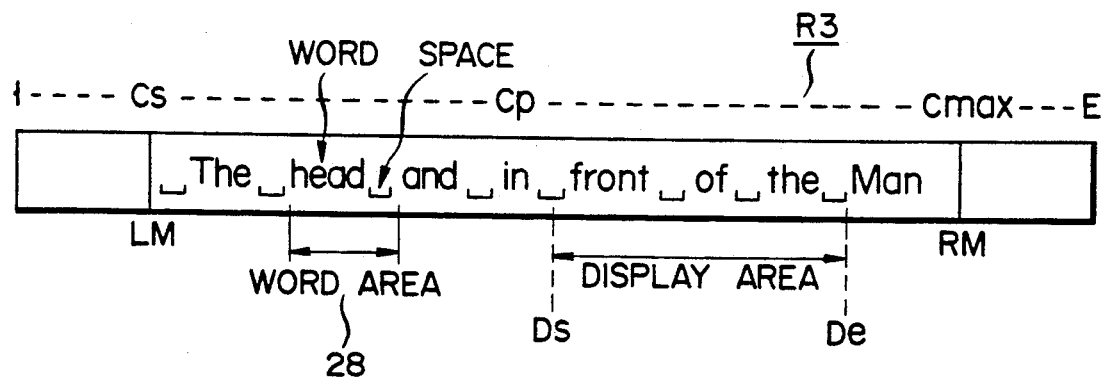
FIG. 4 is a diagram showing the detail construction of a one-line buffer shown in FIG. 3.

As shown in FIG. 4, one-line buffer R3 includes sequential memory locations capable of storing character data of a number corresponding to the maximum movable range of carriage 5 which is set between Cp="1" and CP="E". Each character data is stored in a location specified by carriage position Cp. When the right and left margins are set before the sentence input operation is started, locations which can be used in buffer R3 are defined between Cp=Cs (left margin position) and Cp=Cmax (right margin position).

Display 9 displays a preset number of successive character data stored in one-line buffer R3, for example, character data stored in positions corresponding to the range defined by carriage position (printing position) Cp from Ds to De. The display range is shifted according to the movement of carriage position Cp.

Further, locations occupied by a word and the following space stored in one-line buffer R3 is defined as word area 28.

Figure 6:
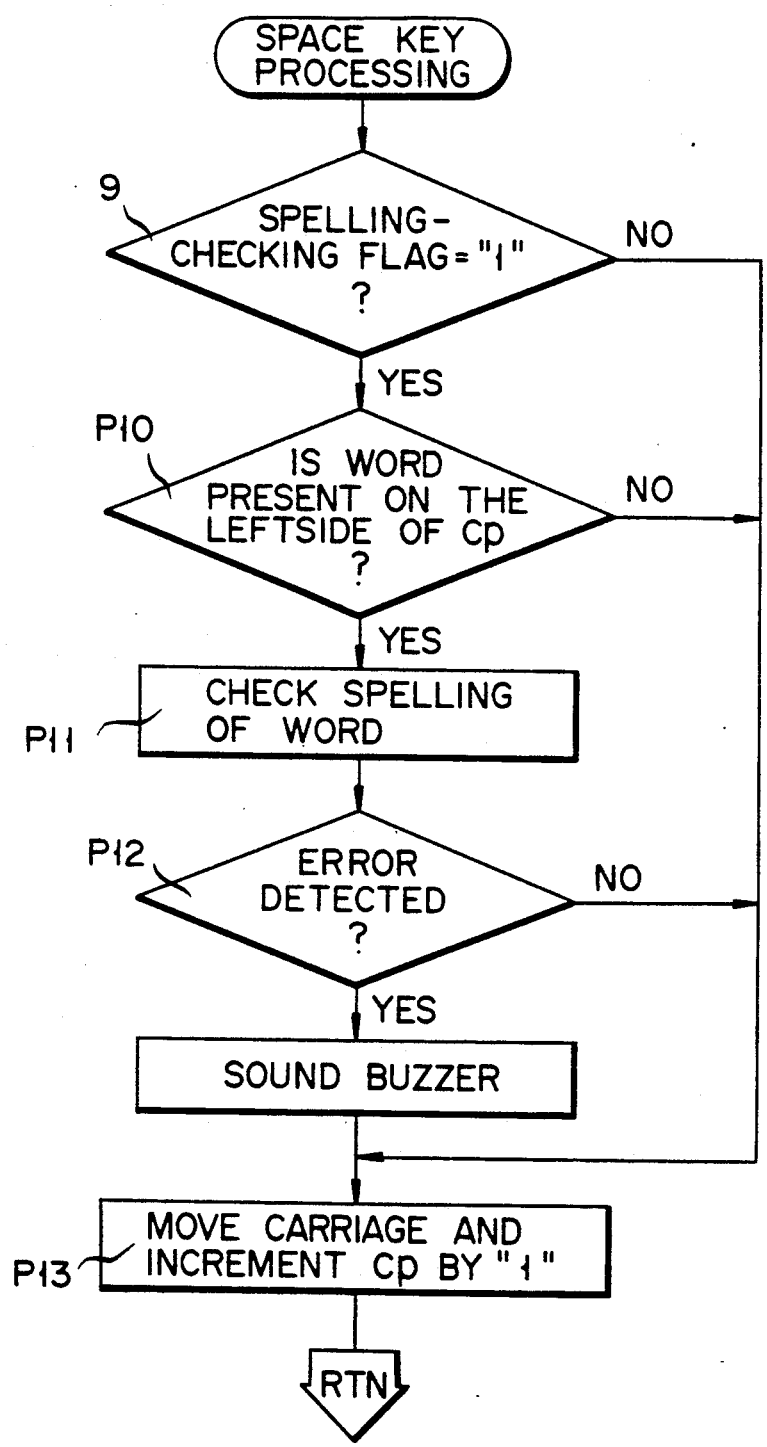

When the power source of the electronic typewriter with the spelling-checking function is turned on, CPU 17 reads out the control program from ROM 18 to start the processing shown by the flowchart in FIG. 6. First, CPU 17 performs an initialization process so as to clear various memory areas R1 to RN of RAM 19 and set the input/output ports to a initial condition, for example. At this time, all the flags in flag register R1 are set to "0". Thus, keyboard 2 is ready for the key-in operation.

Figure 5A:
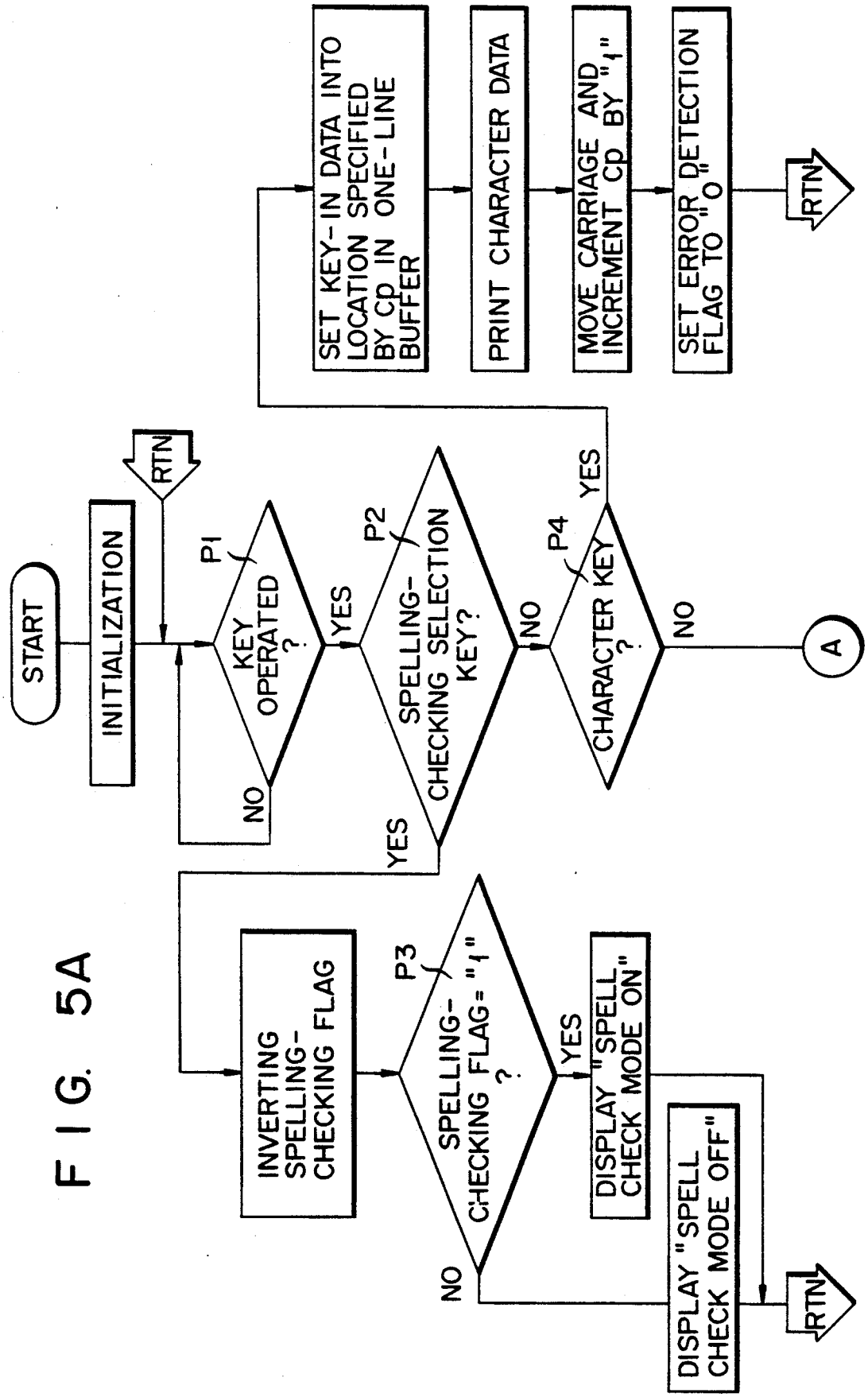
FIGS. 5A, 5B, 6 and 7 are flowcharts illustrating the operation of the control circuit shown in FIG. 2A.

In FIG. 5A, if it is detected in step P1 that a key is operated on keyboard 2, the type of the operated key is checked. If it is detected in step P2 that the operated key is spelling-checking selection key 14a, the spelling-checking flag in flag register R1 is inverted. Then, the inverted spelling-checking flag is checked in step P3, and if it is detected that the flag is set at "1", it is determined that the key operation of selection key 14a is effected to set the "spelling-checking" mode. In this case, CPU 17 displays information that the "spelling-checking" mode is set on display 9 for a preset period of time.

However, if it is detected in step P3 that the spelling-checking flag is set at "0", it is determined that selection key 14 is operated to reset the "spelling-checking" mode, and a message indicating that the "spelling-checking" mode is reset is displayed on display 9.

When it is detected in step 4 that the operated key is alphabet key 10 or numeral key 11 which is accompanied by the printing operation, a corresponding character code is stored in that location of one-line buffer R3 which is indicated by carriage position Cp in pointer register R2. Then, a character specified by the character code is printed on printing paper 3 set on platen 4 by means of the printing head including printing wheel 6 and printing hammer 7 mounted on carriage 5. After this, carriage motor 20 is driven to move carriage 5 in a rightward direction by one character, and carriage position Cp in pointer register R2 is incremented by one. Then, the error detection flag in flag area R1 is set to "0".

Further, if it is detected in step P5 that space key 12 is the operated key, the space key processing is effected in step P6 as will be described later.

Likewise, if it is detected in step P7 that carriage return key (CR) 13 is operated, the carriage return processing is effected in step P8 as will be described later.

If it is detected in step P7 that the operated key is not carriage return key 13, the key processing corresponding to the operated function key is effected in step P20, and the error detection flag in flag register R1 is set to "0".

FIG. 6 is a flowchart showing the space key processing effected in step P6 shown in FIG. 5.

In step P9 of FIG. 6, the state of the spelling-checking flag in flag register R1 is checked. If the spelling-checking flag is set at "1", and when it is detected in step P10 that a word is stored in one-line buffer R3 on the left side of carriage position Cp indicated by the content of carriage pointer register R2, the spelling of the word is checked in step P11. That is, the word is read out and supplied to spelling-checking unit 27 for the spelling-checking operation.

When control section 16 has received information of misspelling from spelling-checking unit 27 in step P12, it activates buzzer 24 to sound only for a short period of time. Then, in step P13, carriage motor 20 is driven to move carriage 5 in a rightward direction by one character, and performing an ordinary space processing in which carriage position data Cp stored in carriage pointer register R2 is incremented by "1". If it is detected in step P12 that the checked word is correctly spelled, the space processing is effected in step P13 without sounding buzzer 24.

Further, when it is detected in step P10 that there is no word on the left side of carriage position Cp or when it is detected in step P9 that the spelling-checking flag is set to "0", it is not necessary to effect the spelling-checking operation. Therefore, in this case, the space key processing is effected in step P13.

Figure 7:
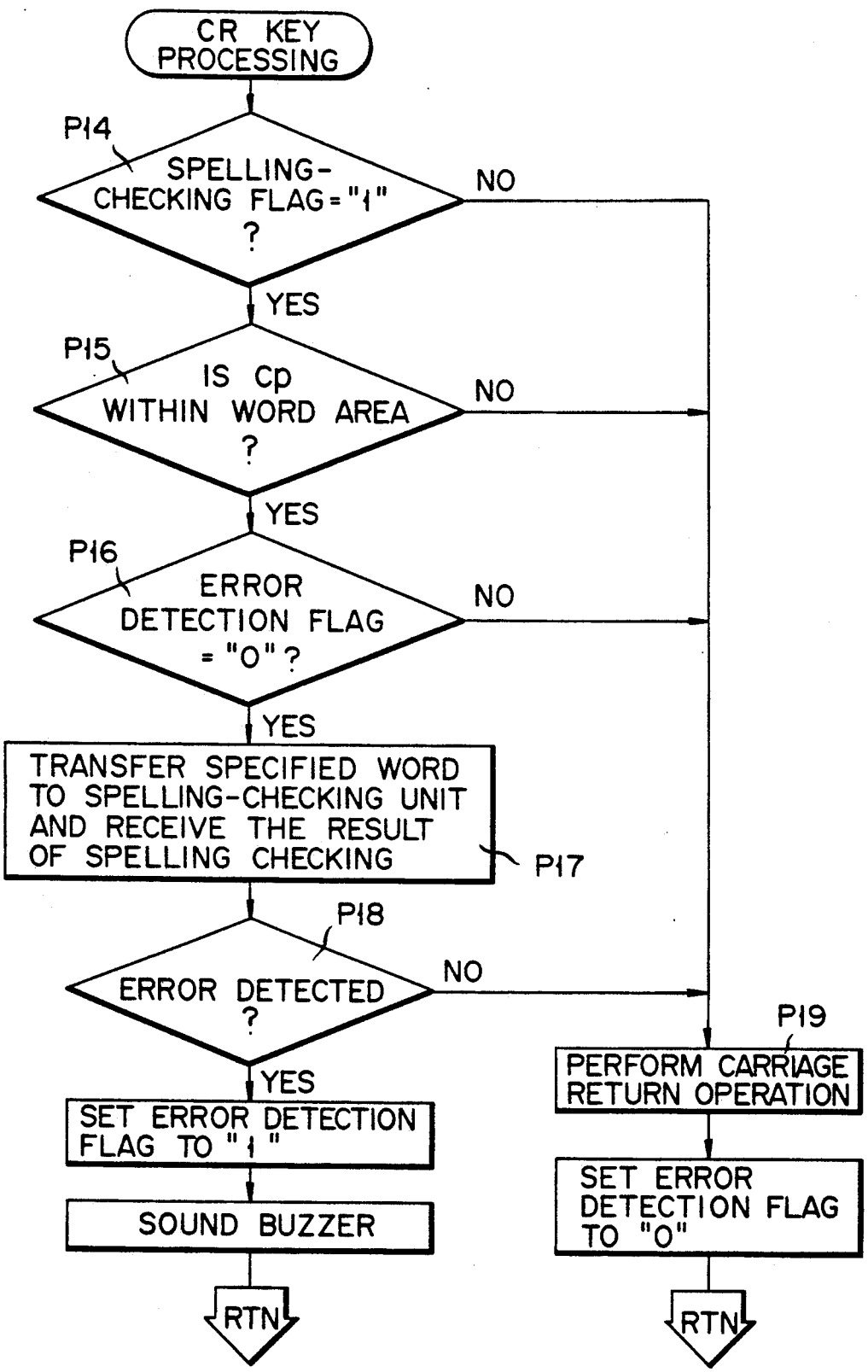

FIG. 7 is a flowchart showing the carriage return (CR) key processing effected in step P8 in FIG. 6.

If it is detected in step P14 that the spelling-checking flag in flag register R1 is set at "1", and when it is detected in step P15 that carriage position Cp is set within word area 28 which is constituted by a word stored in one-line buffer R3 and a space provided on the right side of the word shown in FIG. 4, then the error detection flag in flag register R1 is checked in step P16. When the error detection flag is set at "0", step P17 is effected to read out, from one-line buffer R3, the word in word area 28 in which carriage position Cp is set, and the spelling of the word is checked.

When control section 16 has received information of misspelling from spelling-checking unit 27 in step P18, it sets the error detection flag in flag register R1 to "1". Then, it activates buzzer 24 to sound only for a short period of time without performing the carriage return processing. If it is detected in step P18 that the checked word is correctly spelled, an ordinary carriage return processing is effected in step P19.

After the carriage return processing is completed, the error detection flag in flag register R1 is set to "0".

When it is detected in step P16 that the error detection flag in flag resister R1 has already been set to "1", it is determined that the carriage return key is operated after a word stored in portion of word area 28 which corresponds to the position of carriage 5 is detected to be misspelled and before the misspelled word is corrected. Since, in this case, it is not necessary to check the spelling of the word, the carriage return processing is effected in step P19. When it is detected in step P15 that carriage position Cp is not set in word area 28 shown in FIG. 5, or when it is detected in step P14 that the spelling-checking flag is set at "0", it is not necessary to effect the spelling-checking operation. Therefore, in this case, the carriage return processing is effected in step P19.

With the electronic typewriter having the spelling-checking function as described above, the operation mode is set to the "spelling-checking" mode by operation of spelling-checking selection key 14a after the turn-on of the power source switch and before the starting of the typing operation. Then, character keys of keyboard 2 such as alphabet keys 10 and numeral keys 11 and space key 12 are sequentially operated to enter sentences. Each time space key 12 is operated after the character key operation for one word is completed, the spelling of the word entered immediately before the space key operation is checked. Only when the word is detected to be misspelled, an alarm sound is generated from buzzer 24. When the operator hears the buzzer sound, the operator operates back space key 34, for example, to move carriage 5 back to the error character position, operates correction key 36 to erase the error character, and then operates the character key to type a correct character in a corresponding position. In this case, it is possible to omit the correction operation.

When various keys are sequentially operated to enter document data and carriage 5 reaches a position near right margin position Cmax set at the right end portion, carriage return key 13 is operated. At this time, the spelling of a word entered immediately before the carriage return key is operated is checked. If the word is detected to be correctly spelled, the carriage return processing is immediately effected. In contrast, if the word is detected to be misspelled, buzzer 24 is activated to generate an alarm sound, and in this case, the carriage return processing is not effected. Thus, the operator can correct the error character by easy key operations as well as in the correction operation for a misspelled word occurring in a position other than the last word position in the line. That is, carriage 5 can be easily set on an error character in the misspelled word.

In the embodiment described above, even in a case where a word is detected to be misspelled in the spelling-checking process effected in response to the operation of the carriage return key, and an alarm sound is generated from buzzer 24 and then the carriage return processing is cancelled, it is not always necessary to correct the misspelled word. After this, if the carriage return key is operated again, the carriage return processing is effected with the misspelled word kept unchanged.

Thus, if a misspelling is detected in the spelling-checking process effected in response to the operation of the carriage return key, the carriage return operation is inhibited so that the carriage can be easily set in an error character position, enhancing the error correction efficiency. Further, the operability of the electronic typewriter in its entirety can be greatly improved.

In the embodiment described above, the condition for permitting the spelling-checking process to be effected in response to the operation of carriage return key 13 is made less strict. That is, in the prior art electronic typewriter with the spelling-checking function, the spelling-checking operation for a word is effected only when the carriage return key is operated in a condition which is the same as that for effecting the spelling-checking operation in response to the space key operation and in which carriage position Cp is set next to the right side of the word to be checked. However, in the embodiment described above, the spelling of a word can be checked in response to the operation of carriage return key 13 if carriage position Cp is set on word area 28 including the word and the following space. Therefore, even if the carriage return key is operated after an error character is corrected or when carriage 5 is set on a word, the spelling of the corrected word can be checked. In this case, since it is not necessary to set carriage 5 in the position of the space following the corrected word, the operation efficiency of editing and correcting the input sentence can be further enhanced.

Figure 8:
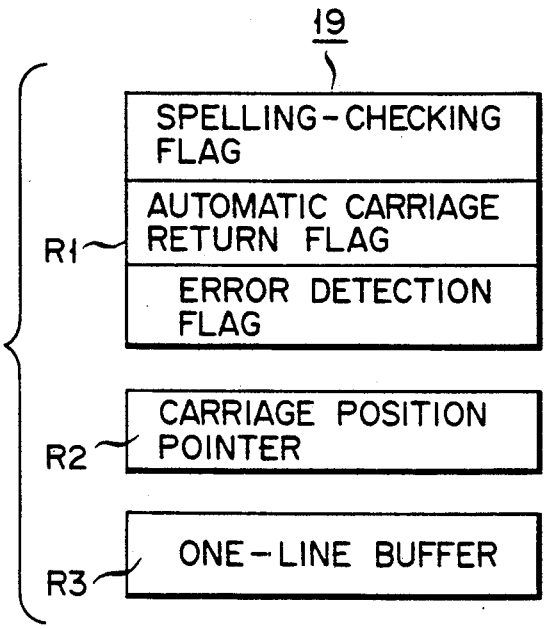
FIG. 8 is a block diagram showing main memory areas contained in the RAM used in an electronic typewriter according to a second embodiment of this invention.
Figure 9:
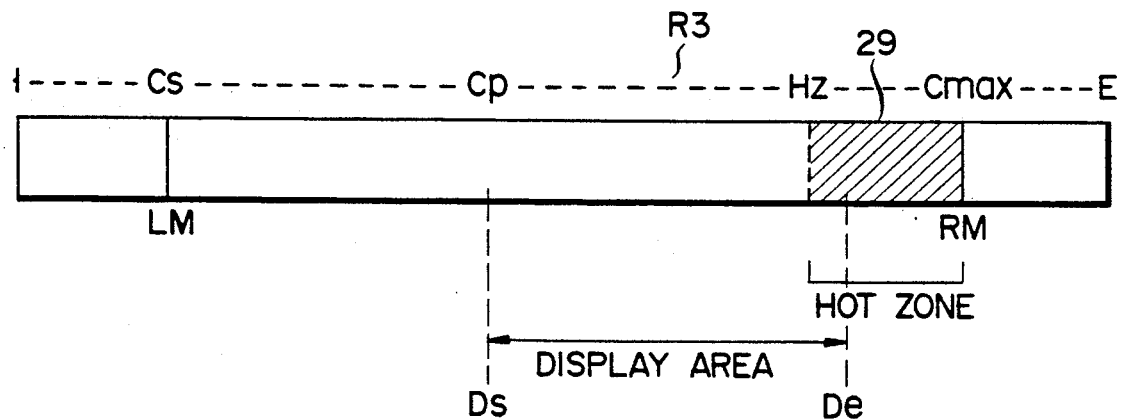
FIG. 9 is a diagram showing the detail construction of a one-line buffer in the electronic typewriter of the second embodiment.

Now, an electronic typewriter with a spelling-checking function according to a second embodiment of this invention is explained with reference to FIGS. 8 to 11B. The electronic typewriter is designed to perform the automatic carriage return operation and spelling-checking process in response to the operation of the space key when the carriage is set in a hot zone provided at the end portion of each line. The electronic typewriter is constituted in the same manner as that of the first embodiment except the following respects, and the same explanation and drawings as those for the latter are omitted for brevity. The same portions in FIGS. 8 to 11B are denoted by the same reference numerals. The electronic typewriter of the second embodiment is different from that of the first embodiment in the control program stored in ROM 17. In the second embodiment, as shown in FIG. 8, memory area R1 or RAM 19 is used to store an automatic carriage return flag in addition to spelling-checking and error detection flags. As shown in FIG. 9, one-line buffer R3 has hot zone 29 on the left side of right margin position Cmax. Entry or starting position Hz of hot zone 29 is set in a position apart from right margin position Cmax by 6 to 8 characters in a leftward direction.

Figure 5B:
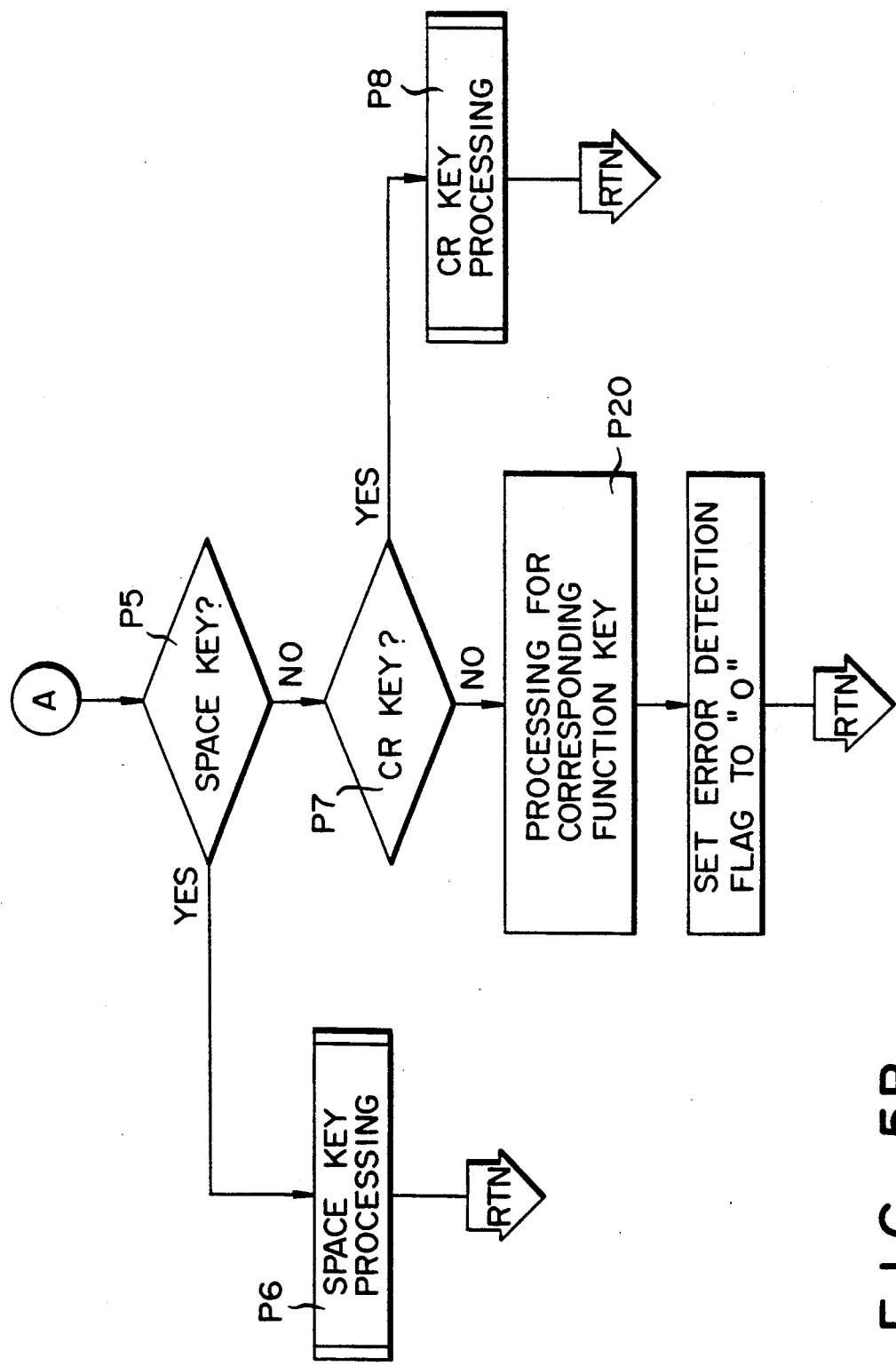
Figure 10A:
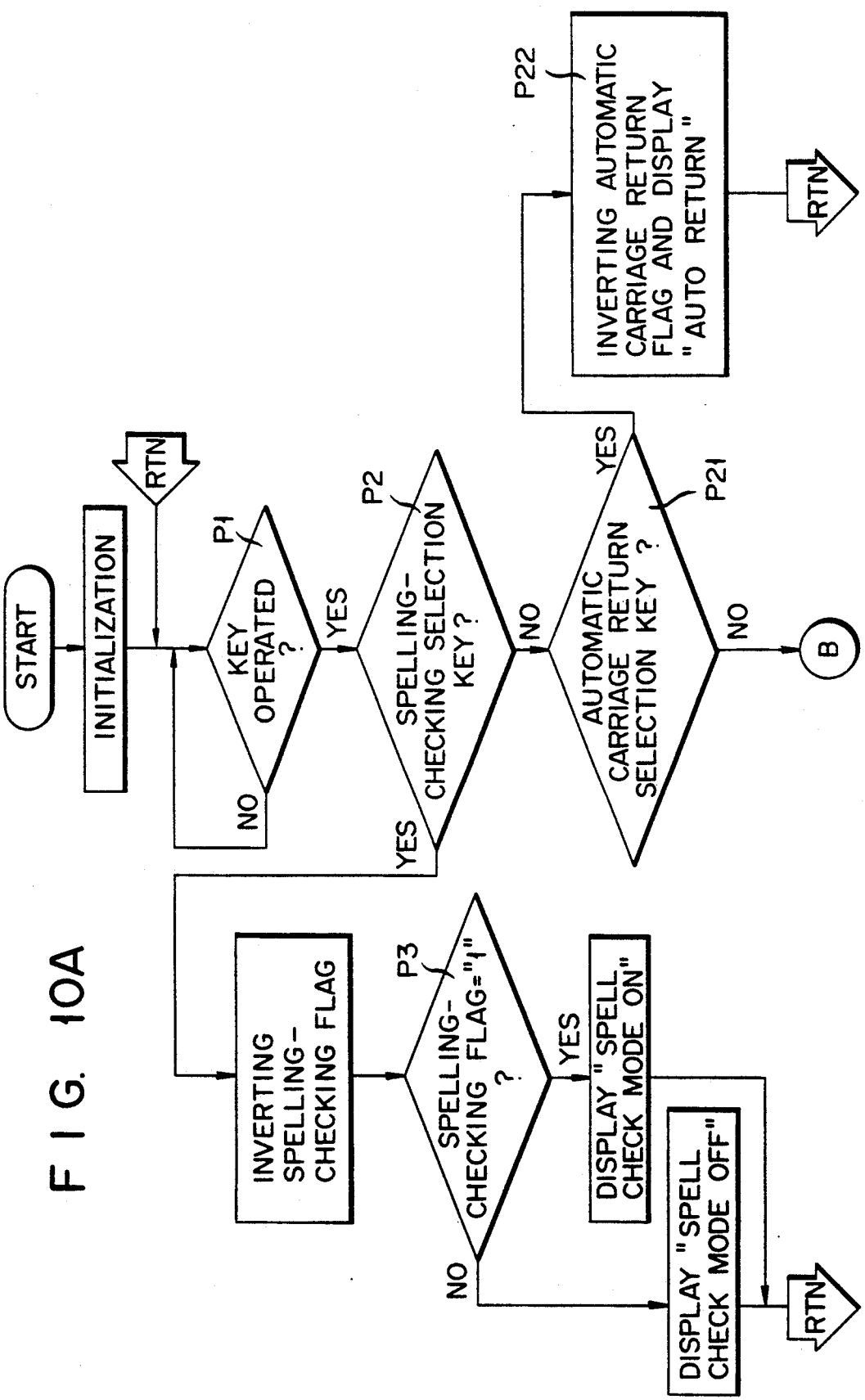
Figure 10B:
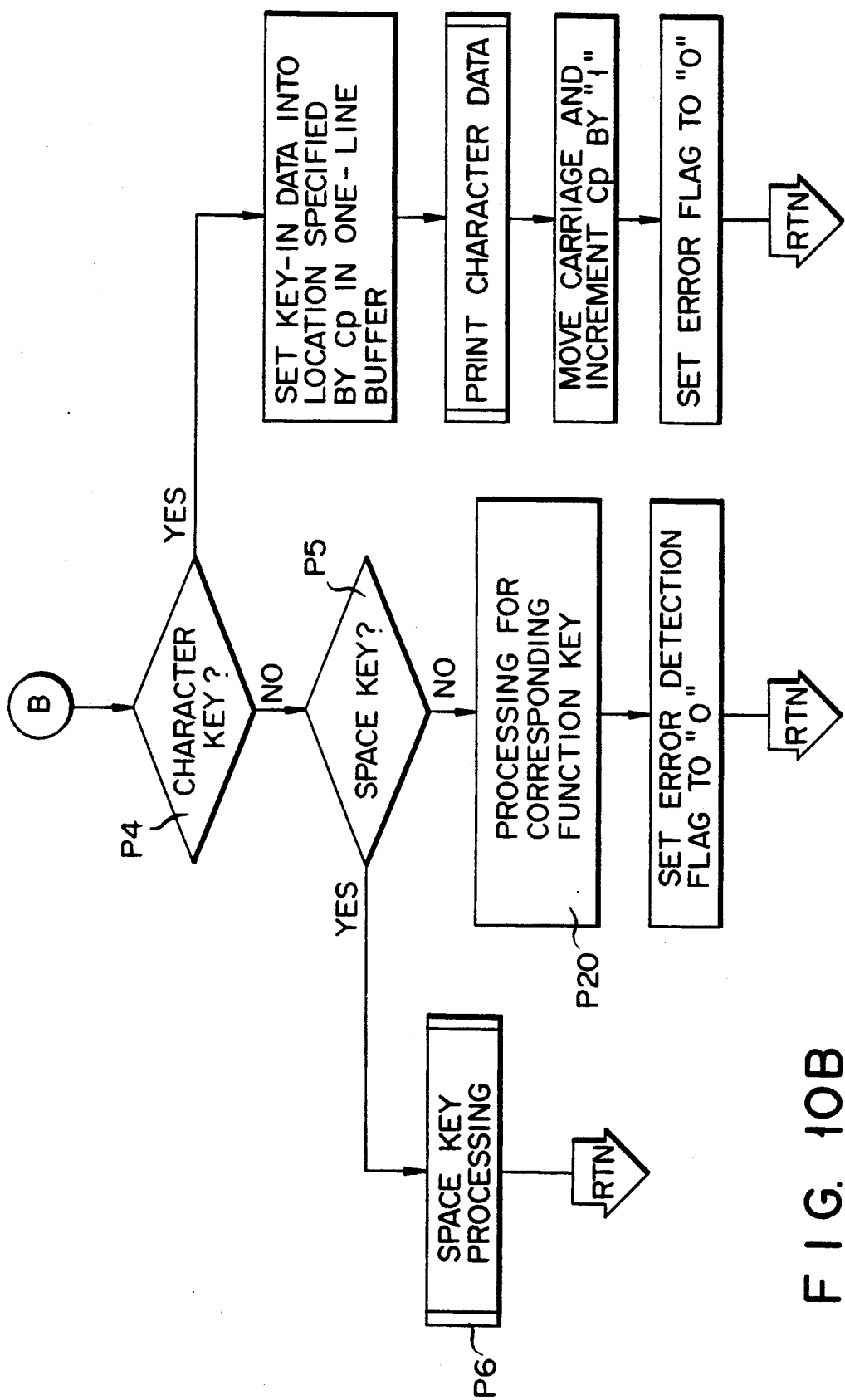
Figure 11B:
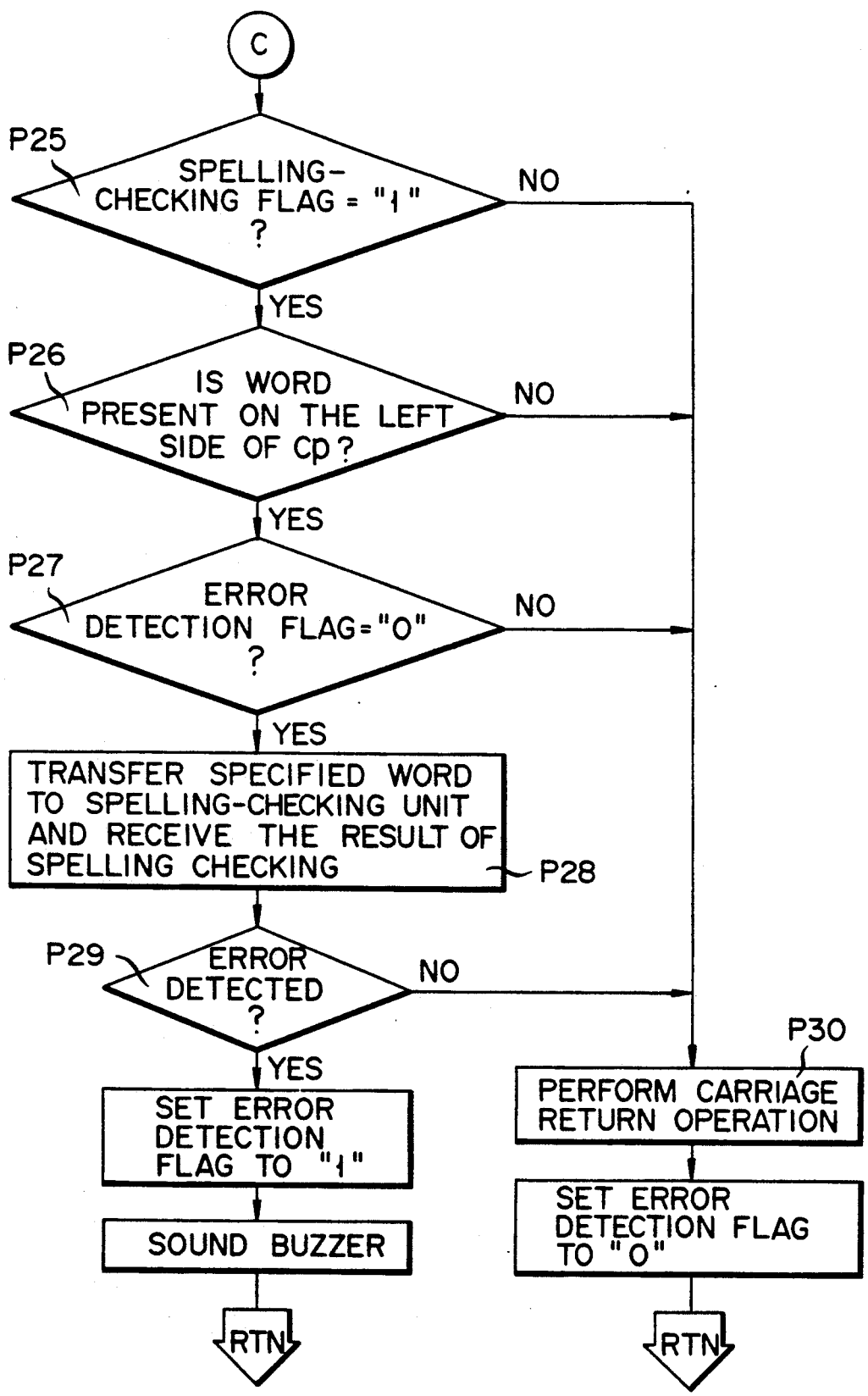

FIGS. 10A and 10B are flowcharts obtained by modifying the flowcharts shown in FIGS. 5A and 5B of the first embodiment. FIGS. 11A and 11B are flowcharts obtained by modifying the flowchart shown in FIG. 6 of the first embodiment. The control program of the second embodiment also includes steps P7 and P8 shown in FIG. 5B, but these steps are not shown in FIGS. 10A and 10B for brevity.

As shown in FIG. 10A, when it is detected in step P2 that the operated key is not spelling-checking selection key 14a, step P21 is effected. If it is detected in step P21 that the operated key is automatic carriage return selection key 14c, the automatic carriage return flag in flag register R1 is inverted in step P22. If, in this case, the inverted automatic carriage return flag is "1", the automatic carriage return mode is displayed and the process is returned to step P1.

In a case where it is detected in step P5 that the operated key is space key 12, the space key processing shown in FIGS. 11A and 11B is effected in step P6. In the space key processing, it is first checked in step P23 whether or not the automatic carriage return flag in flag register R1 is "1". After determining that the automatic carriage return flag is "1", if it is detected in step P24 that carriage position Cp in pointer register R2 has reached starting position Hz of hot zone 29, step P25 is effected. Then, if it is detected in step P25 that the spelling-checking flag in flag register R1 is set at "1", it is checked in step P26 whether or not a word is stored on the left position of carriage position Cp. If "yes" in step P26, the state of the error detection flag in flag resister R1 is checked in step P27. If the error detection flag is detected to be "0", a word on the left position of carriage position Cp is read out in step P28 and supplied to spelling-checking unit 27 for spelling-checking process.

In step P29, if information that the checked word is misspelled is received from spelling-checking unit 27, the error detection flag in flag register R1 is set to "1", and buzzer 24 is activated for a brief period of time without performing the carriage return operation.

If, in step P29, information that the checked word is correctly spelled is received from spelling-checking unit 27, the carriage return operation is effected in step P30. That is, carriage 5 is returned to the print starting position on the left side and paper feed motor 22 is driven to feed paper 3 by one line.

After the carriage return operation is completed, the error detection flag in flag register R1 is set to "0".

If it is detected in step P27 that the error detection flag in flag register R1 has been set at "1", it is determined that the space key operation detected at this time has been effected without correcting a word which was detected to be misspelled after the preceding space key operation was effected when carriage position Cp was set in hot zone 29. Since, in this case, it is not necessary to check the spelling of the word, the carriage return operation is effected in step P30. If no word is detected on the left position of carriage position Cp in step P26, or if the spelling-checking flag is detected to be set at "0" in step P25, then the carriage return operation is effected in step P30 since no spelling-checking operation is required.

If it is detected in step P24 that carriage position Cp has not reached starting position Hz of hot zone 29, or the automatic CR flag in flag register R1 is detected to be set at "0" in step P23, it is not necessary to perform the carriage return operation. In this case, step P9 is effected to check whether or not the spelling-checking flag is set at "0". If it is detected that the spelling-checking flag is set at "1" and a word is detected to be stored in the left position of carriage position Cp, the spelling-checking operation is effected in step P11.

If the checked word is detected to be misspelled, buzzer 24 is activated and then the normal space processing of step P13 is effected to move carriage 5 by one character in the rightward direction. In contrast, if no misspelling is detected, the space key processing is effected without activating buzzer 24.

With the electronic typewriter having the function described above, selection keys 14a and 14b are operated to set the spelling-checking mode and automatic CR mode after the power source is turned on and before the typing operation is started. Then, character keys such as alphabet keys 10 and numeral keys 11 and space key 12 are operated to sequentially enter sentences. In this case, each time space key 12 is operated after each word is entered, the spelling of the word entered immediately before the space key operation is checked. Only when the checked word is detected to be misspelled, buzzer 24 is activated to generate alarm sound. When hearing the alarm sound, the operator operates the back space key, for example, to set carriage 5 in the position corresponding to the error letter or character. Then, the operator operates the correction key to erase the error character and types a correct character on the erased character. In this case, it is possible not to perform the correction operation.

Then, the character key operation is further effected to successively enter sentences, and when the space key operation is effected after carriage position Cp has been set in hot zone 29, the spelling-checking operation for a word entered in the left position of carriage position Cp is effected. At this time, if the checked word is detected to be correctly spelled, the carriage return operation is effected. In contrast, if the checked word is detected to be misspelled, buzzer 24 is activated to generate alarm sound but the carriage return operation is not effected. Therefore, the operator may correct the error character by such an easy key operation as in the correction operation for a misspelled word entered on the half way of the line. That is, the carriage 5 is easily set on the error character of the misspelled word.

Further, if a misspelled word is detected when carriage position Cp is set in hot zone 29, buzzer 24 is activated and the carriage return operation is cancelled. Even in this case, it is not always necessary to perform the correction operation. After this, if the space key operation is successively effected, the carriage return operation is effected with the misspelled word kept unchanged.

As described above, if a misspelled word is detected when carriage position Cp is set in hot zone 29, the automatic carriage return operation is cancelled so that carriage 5 can be easily set on the error character, thus enhancing the operability of the misspelling correction operation.

Next, an electronic typewriter with the spelling-checking function according to a third embodiment of this invention is explained with reference to FIGS. 12 to 15. The electronic typewriter is designed to perform the tab processing and spelling-checking operation when the tab key is operated. The electronic typewriter is constituted in the same manner as that of the second embodiment except the following respects, and the same explanation and drawings as those for the latter are omitted for brevity. The same portions in FIGS. 12 to 15 are denoted by the same reference numerals. In the electronic typewriter of the third embodiment, the control program stored in ROM 17 is further modified based on that of the second embodiment. In this case, as shown in FIG. 12, memory area R4 of RAM 19 constitutes a tab-set memory for storing tab position Tb at which carriage 5 is set by the operation of tab key 15a. Flag register R1 is used to store an automatic carriage return flag, but the flag has no relation to the tab processing and therefore the flag is not shown in FIG. 12. As shown in FIG. 13, one-line buffer R3 is so constructed that tab position Tb can be used to store a next input character in response to the operation of tab key 15a.

Figure 14A:
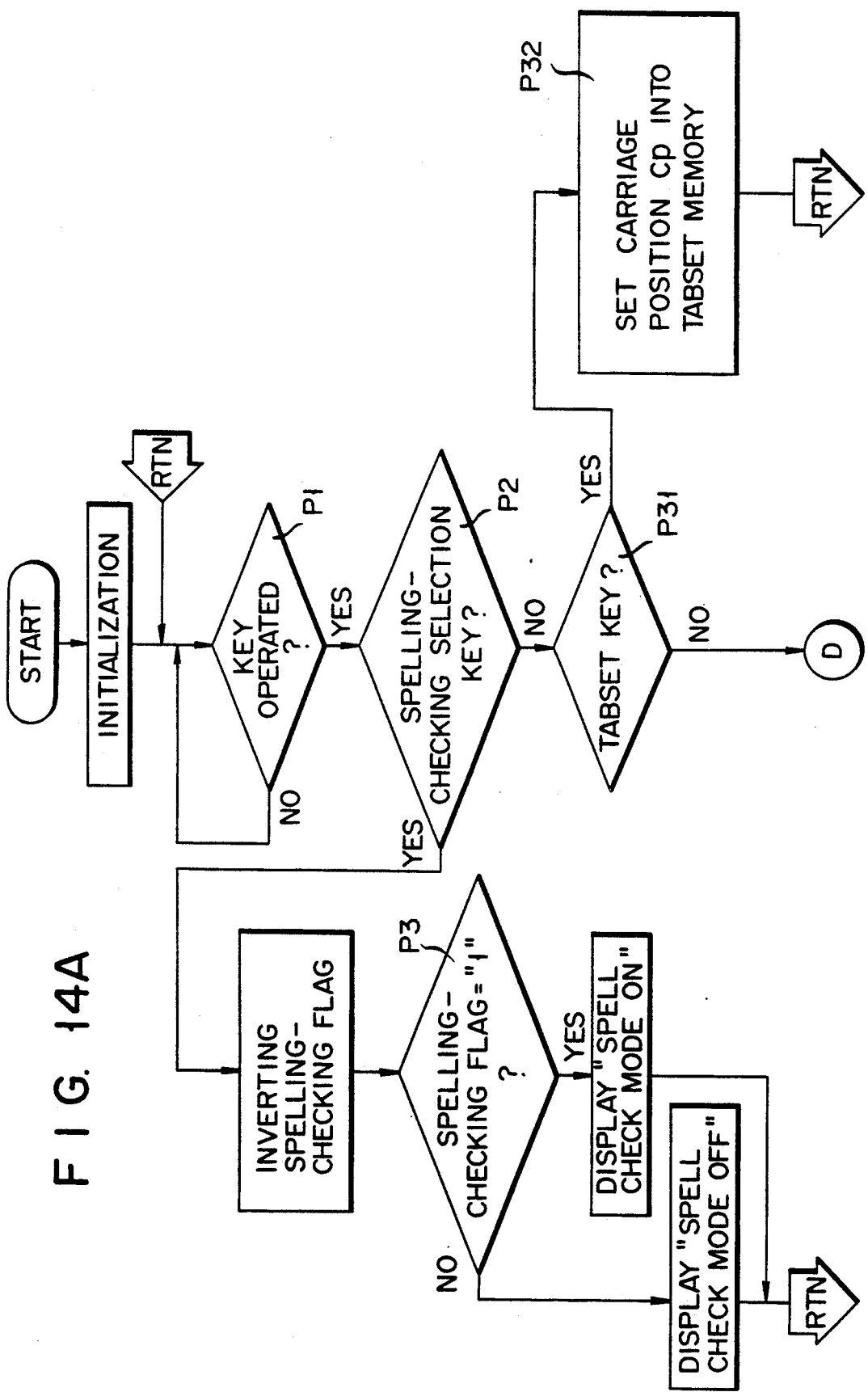
FIGS. 14A to 15 are flowcharts illustrating the operation of the control circuit in the third embodiment.
Figure 14B:
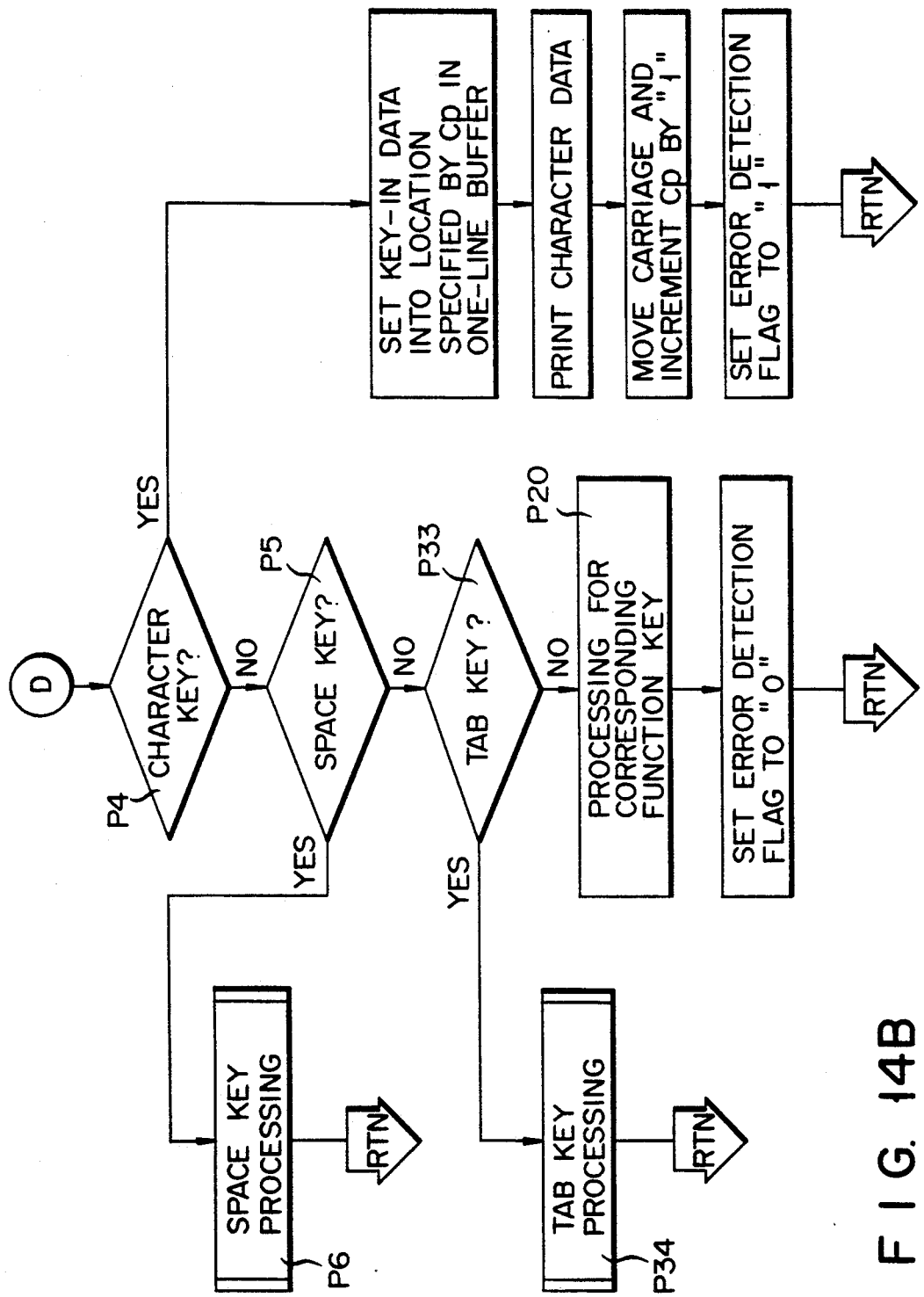
Figure 15:
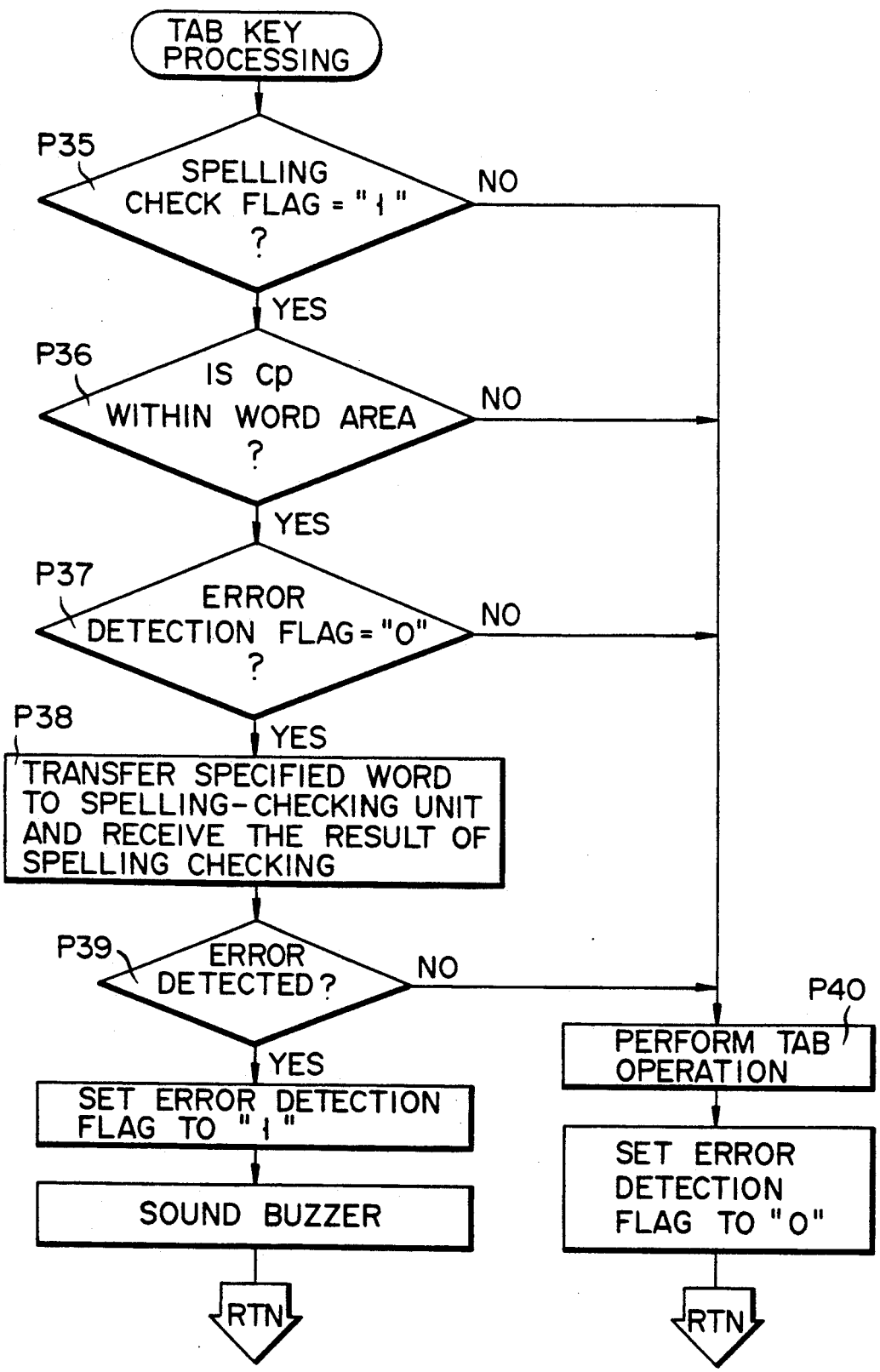

FIGS. 14A and 14B are flowcharts obtained by modifying flowcharts of the second embodiment shown in FIGS. 5A and 5B, and FIG. 15 is a flowchart showing the tab key processing shown in FIG. 14B. The control program includes steps P21 and P22 shown in FIG. 10A, but the steps are not shown in FIGS. 14A and 14B for brevity.

As shown in FIG. 14, if it is detected in step P2 that the operated key is not spelling-checking selection key 14a, it is checked in step P31 whether or not the operated key is tab set key 15b. If "yes" in step P31, current position Cp of carriage 5 is stored in tab-set memory R4 in step P32 and then step P1 is effected.

If it is detected in step P5 that the operated key is not space key 12, it is checked in step P33 whether or not the operated key is tab key 15. If "yes" in step P33, the tab key processing is effected in step P34 as shown in FIG. 15. In the tab key processing, after it is detected in step P35 that the spelling-checking flag in flag register R1 is set at "1", it is checked in step P36 whether or not carriage position Cp is set in a word area defined by a word and a space on the right position of the word in one-line buffer R3. If "yes" in step P36, the state of the error detection flag in flag register R1 is checked in step P37. If the error detection flag is detected to be set at "0", a word in word area 28 specified by carriage position Cp is read out and the spelling-checking operation for the readout word is effected in step P38.

If information that the checked word is misspelled is received from spelling-checking unit 27 in step P39, the error detection flag in flag register R1 is set to "1". Further, buzzer 24 is activated for a preset brief period of time without performing the tab key processing.

If information that the checked word is correctly spelled is received from spelling-checking unit 27 in step P39, the normal tab key processing is effected in step P40. That is, carriage 5 is moved in a rightward direction until carriage position Cp of pointer register R2 becomes equal to tab position Tb in tab-set memory R4. The error detection flag in flag register R1 is set to "0" after the tab key processing in step P40 is completed.

If it is detected in step P37 that the error detection flag in flag register R1 has already been set at "1", it is determined that the tab key operation detected at this time has been effected without correcting a word which is located in word area 28 specified by carriage 5 and was detected to be misspelled by the preceding tab key operation. Since, in this case, it is not necessary to check the spelling of the word, the tab key operation is effected in step P40. Further, if it is detected in step P36 that carriage position Cp is set in word area 28, or the spelling-checking flag is detected to be "0" in step P35, it is not necessary to effect the spelling-checking operation so that the tab key operation is effected in step P40.

With the electronic typewriter having the function described above, selection key 14a is operated to set the spelling-checking mode after the power source is turned on and before the typing operation is started. Then, carriage 5 is moved to tab position Tb by operating space key 12, and tab-set key 15b is operated to store tab position Tb into tab-set memory R4. Tab position Tb can be set at various positions.

After the tab position setting operation is completed, character keys such as alphabet keys 10 and numeral keys 11 and space key 12 are operated to sequentially enter sentences. In this case, each time space key 12 is operated after each word is entered, the spelling of the word entered immediately before the space key operation is checked. Only when the checked word is detected to be misspelled, buzzer 24 is activated to generate alarm sound. When hearing the alarm sound, the operator operates back space key 34, for example, to set carriage 5 in the position corresponding to the error letter or character. Then, the operator operates the correction key to erase the error character and types a correct character on the erased character. In this case, it is possible not to perform the correction operation.

After the character key operation is further effected to successively enter sentences. and when tab key 15a is operated to set carriage 5 to the print starting position of the next sentence, the spelling of a word entered immediately before the tab key operation is checked. If the word is detected to be correctly spelled, the tab operation is effected, and if the word is detected to be misspelled, buzzer 24 is activated to generate alarm sound and no tab operation is effected. Therefore, the operator can easily set carriage 5 in the error character position in comparison with the case of moving carriage 5 from the tab position, and thus the operator can correct the erroneous character.

As described above, the tab key operation is cancelled when the word is detected to be misspelled in the spelling-checking operation which is effected in response to the tab key operation. Therefore, carriage 5 can be easily set in the error character position, and thus the operability of correcting the error character can be improved, enhancing the operability of the electronic typewriter.

In the embodiment described above. the condition for permitting the spelling-checking process to be effected in response to the operation of tab key 15a is made less strict. That is, in the prior art electronic typewriter with the spelling-checking function, the spelling-checking operation for a word is effected only when the tab key is operated in a condition which is the same as that for effecting the spelling-checking operation in response to the space key operation and in which carriage position Cp is set on the right side of the word to be checked. However, in the embodiment described above, the spelling of a word can be checked only if carriage position Cp is set on word area 28 including the word and the following space. Therefore, even if the tab key is operated after an error character is corrected or when carriage 5 is set on a word, the spelling of the corrected word can be checked. In this case, since it is not necessary to set carriage 5 in the position of the space following the corrected word, the operation efficiency of editing and correcting the input sentence can be further enhanced.

Further, even in a case where a word is detected to be misspelled in the spelling-checking process effected in response to the operation of the tab key, and an alarm sound is generated from buzzer 24 and then the tab key processing is cancelled, it is not always necessary to correct the misspelled word. After this, if the tab key is operated again, the tab key processing is effected with the misspelled word kept unchanged. That is, misspelled words can be corrected in the same correction operation, thus further enhancing the efficiency of the correction operation.

Figure 16:
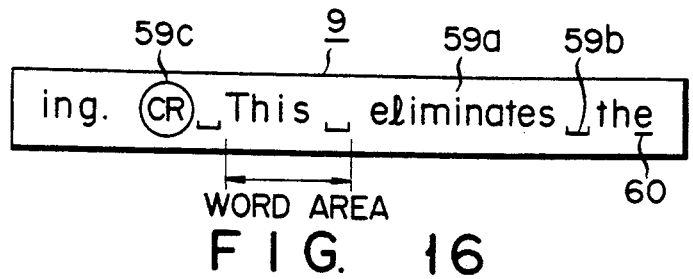
FIG. 16 is a diagram showing the display condition of the display used in an electronic typewriter according to a fourth embodiment.

Next, an electronic typewriter with a spelling-checking function according to a fourth embodiment of this invention is explained with reference to FIGS. 16 to 21. The electronic typewriter is designed to perform the spelling-checking operation in the editing mode. The electronic typewriter is constituted in the same manner as that of the third embodiment except the following respects, and the same explanation and drawings as those for the latter are omitted for brevity. The same portions in FIGS. 16 to 19 are denoted by the same reference numerals. The electronic typewriter of the fourth embodiment is different from that of the third embodiment in that the control program stored in ROM 17 and display 9 are slightly modified. In this example, as shown in FIG. 16, display 9 has a display capacity such as to display 25 character data 59a, space code 59b and carriage return (CR) code 59c. Display 25 is used to display entered characters and cursor 60 indicating carriage position Cp, for example. Further, the mode selection key is operated together with numeral key 11 to select the typing mode, storing mode, editing mode or the like.

Figure 17:
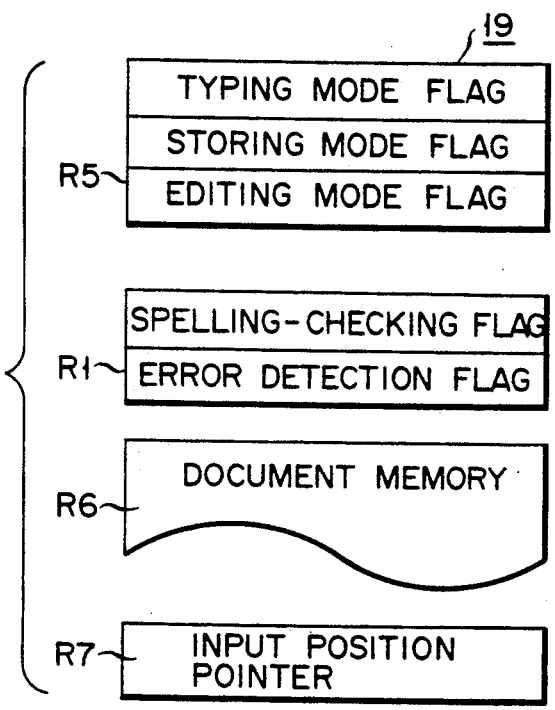
FIG. 17 is a block diagram showing main memory areas contained in the RAM used in the fourth embodiment.

As shown in FIG. 17, in RAM 19, memory area R5 constitutes a flag register for storing typing mode flag, storing mode flag and editing mode flag indicating the operation mode selected by respective mode selection keys 14c, 14d and 14e; memory area R6 constitutes a document memory for sequentially storing character data entered in the storing mode; and memory area R7 constitutes a pointer register indicating input position Cp (position for cursor 15) of document memory R6. The error detection flag in flag register R1 indicates that a misspelling is detected in the spelling-checking operation effected by the carriage return key operation in the editing mode.

Figure 18:
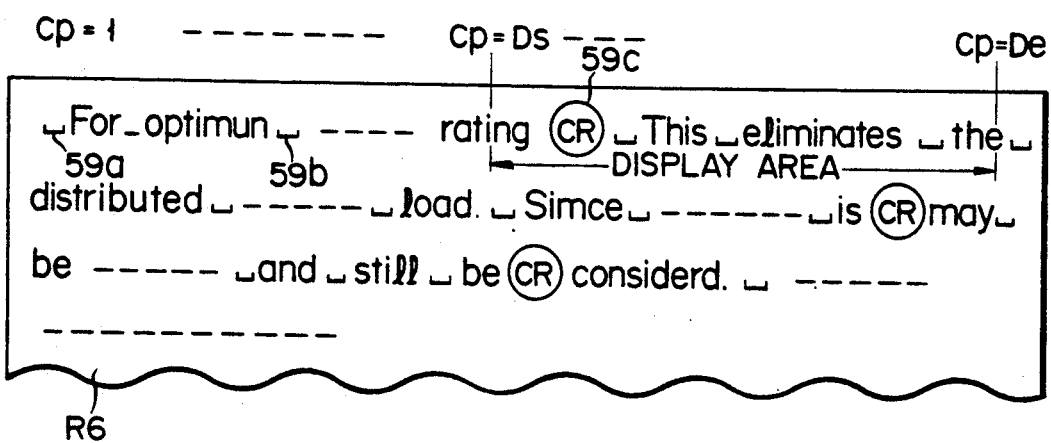
FIG. 18 is a diagram showing the detail construction of a document memory contained in the RAM used in the fourth embodiment.

As shown in FIG. 18, for example, document memory R6 is used to store character data 59a, space code 59b and CR code 59c in such an order as they are entered with reference to input position Cp. Then, 25 data in the range of input position Cp from Ds to De are displayed on display 9. In general, the display range in document memory R6 displayed on display 9 is changed according to the movement of input position Cp which is moved by key operation on keyboard 2. Input position Cp is specified by cursor 60 on display 9. That is, when input position Cp is moved by operating forward (FW) key 35 or back space (BS) key 34 of keyboard 2, cursor 60 moves on display 9 in a specified direction. When cursor 60 has reached the end position on display 9, cursor 60 does not move any more, and the display range (Ds to De) in document memory R3 is shifted.

Figure 19:
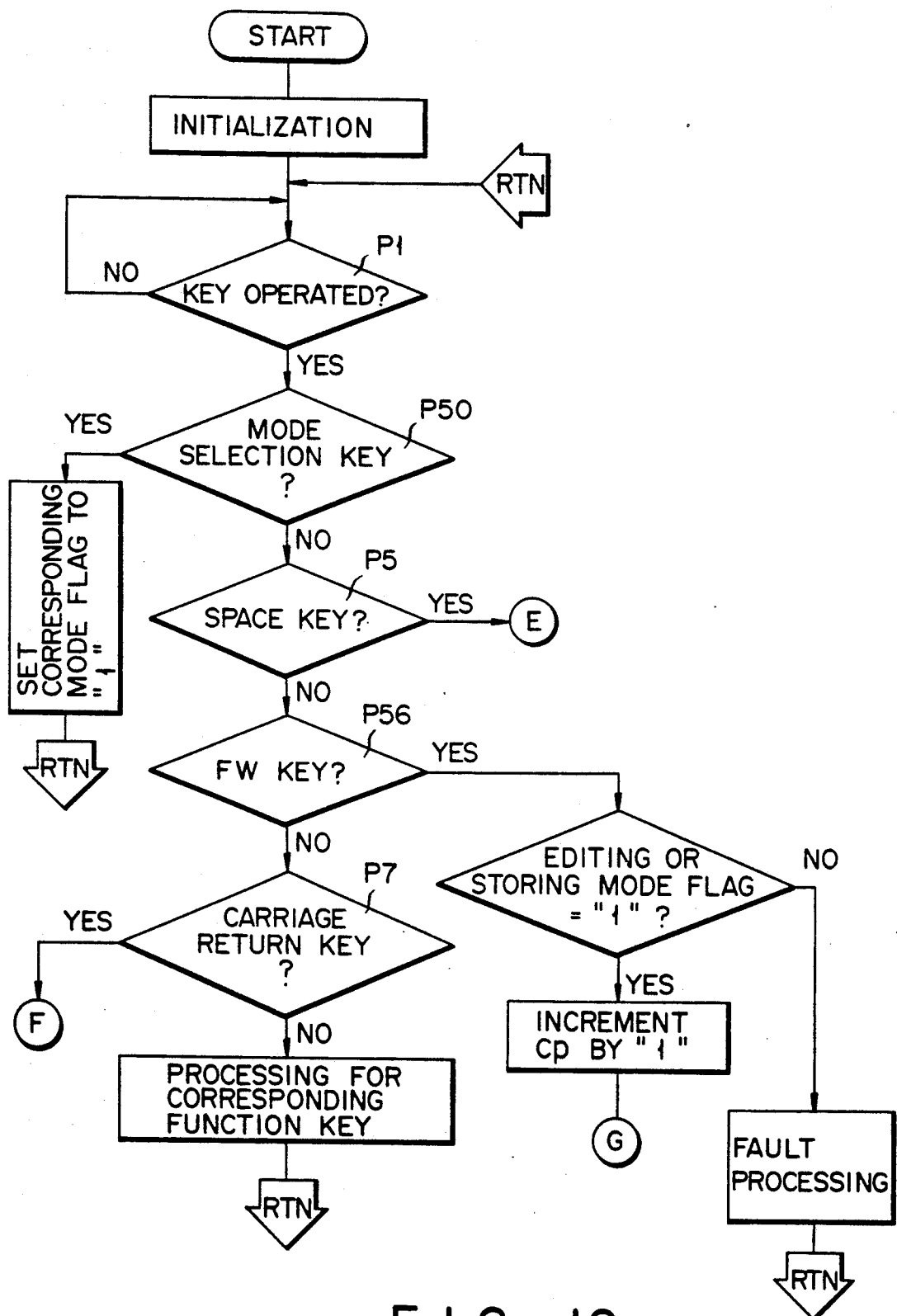
FIGS. 19 to 21 are flowcharts illustrating the operation of the control circuit in the fourth embodiment.
Figure 20:
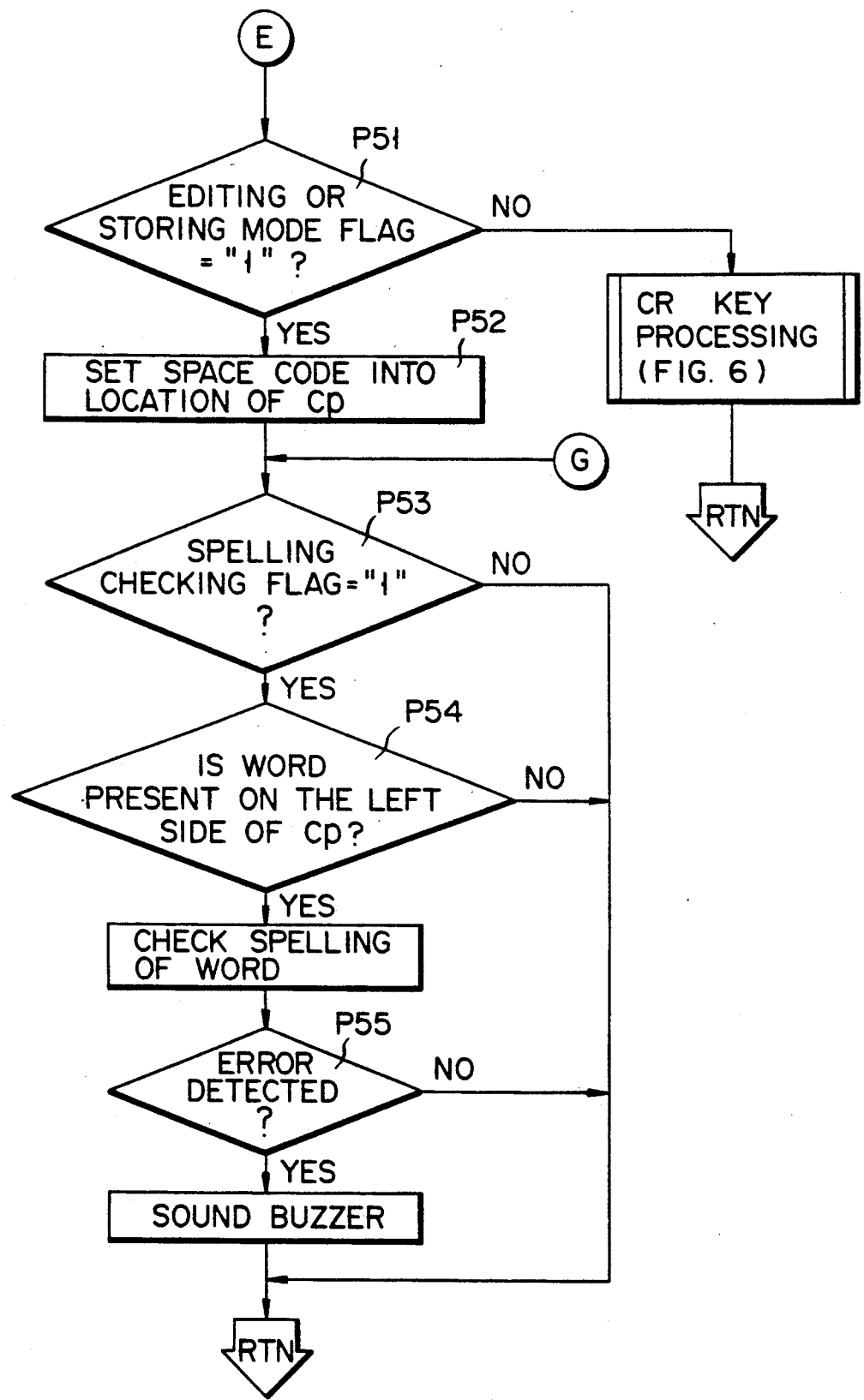
Figure 21:
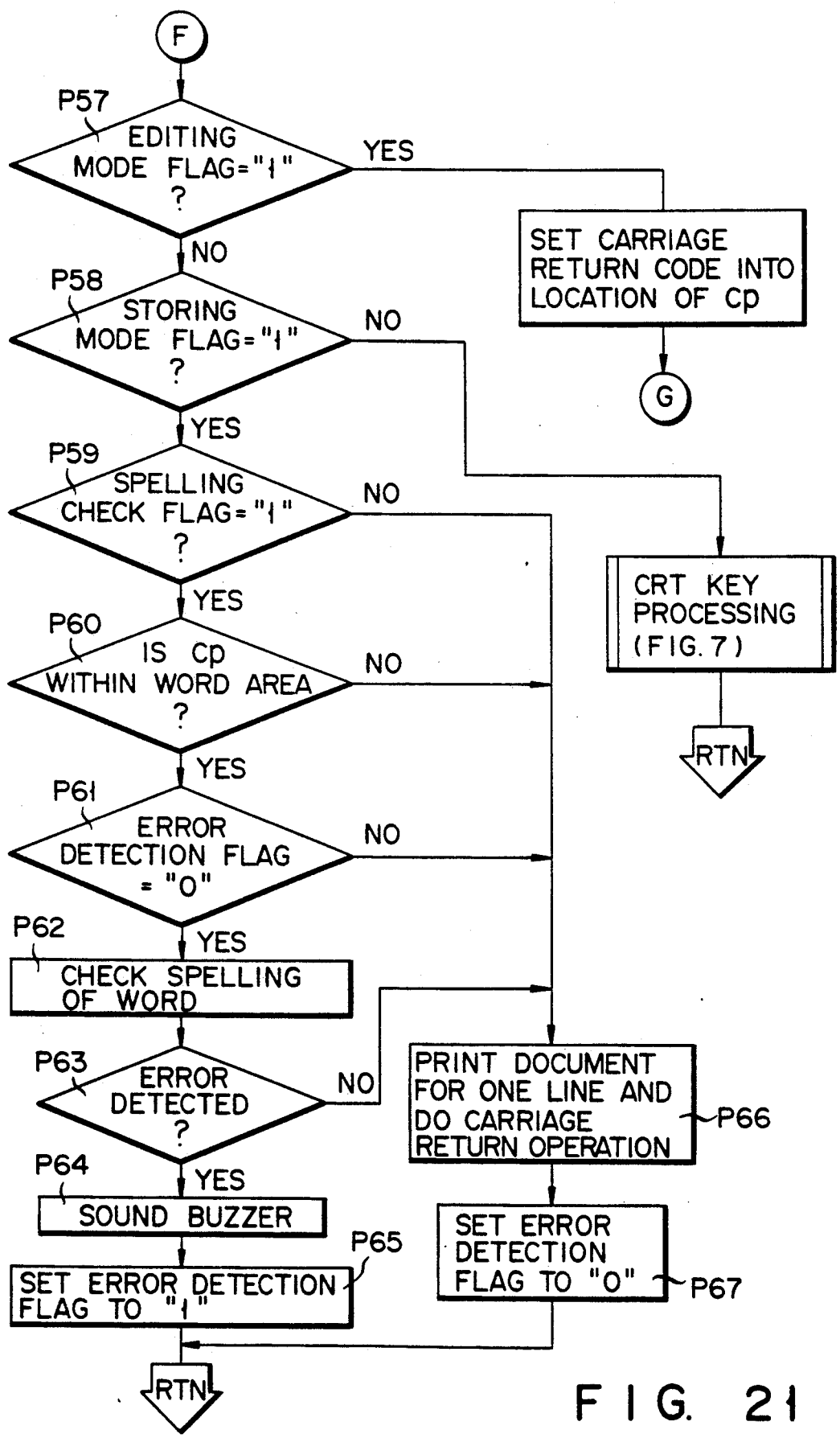

When the power source of the electronic typewriter is turned on, CPU 17 reads out the control program from ROM 18 and starts to process data according to the flowchart shown in FIG. 19. As shown in FIG. 19, CPU 17 first performs the initialization process to clear memory areas R1 to RN of RAM 19 and set input/output port PM1 to the initial condition.

After the initialization process is completed, it becomes possible to effect typing operation at any time.

In FIG. 19, if it is detected in step P1 that a key on keyboard 2 is operated, it is checked in step P50 whether the operated key is one of mode selection keys 14a to 14e or not. If "yes" in step P50, a corresponding mode flag in flag register R5 is set to "1".

If it is detected in step P51 that the operated key is space key 12, then the state of the editing mode flag in flag register R5 is checked in step R51. If it is detected in step P51 that the editing mode is set, it is determined that the operated key detected in step P51 is operated to edit the input character data displayed on display 9. Then, in step P52, the space code is written in the location specified by input position Cp of document memory R6 and input position Cp is incremented after the space code in written. In step P52 if it is detected that the spelling-checking flag in flag register R1 is set at "1", step P54 is effected. When input position Cp (position of cursor 60) is set adjacent to the right side of a word in step P54, the spelling of the word is checked in the same manner as described before. If information that the word is misspelled is received from spelling-checking unit 27 in step P55, buzzer 24 is activated for a preset period of time. After this, step P1 is effected again.

In a case where it is detected in step P53 that the spelling-checking flag is set at "0", if it is detected in step P54 that input position Cp is not set adjacent to the right side of a word, or where the word is detected to be correctly spelled in step P55, step P1 is effected.

Further, in a case where the editing mode flag is detected to be set at "0" in step P51 the space key processing as shown in FIG. 6 is effected.

If the operated key is detected to be forward key 35 is step P56, a check is then made whether or not the editing mode flag in register R5 is set at "1". If "yes", input position Cp is incremented by one, and step P53 is effected. In a case where the editing mode flag is detected to be set at "0", a fault processing is performed, and then step P1 is effected.

Further, if the operated key is detected to be carriage return key 13 in step P7, the state of flags in flag registers R5 and R1 is checked. First, it is checked in step P57 whether or not the editing mode flag is set at "1". If "yes" in step P57, the carriage return code is written in a location specified by input position Cp of document memory R6, and then input position Cp is incremented by one. After this step P53 is effected. If "no" in step P57, it is checked in step P58 whether or not the storing mode flag is set at "1" If "no" in step P58, the CR key processing shown in FIG. 7 is effected. If "yes" in step P58, it is checked in step P59 whether or not the spelling-checking flag is set at "1".

If "yes" in step P59, it is checked in step P60 whether or not input position Cp (position of cursor 60) is set in a word area defined by a word and a space on the right position of the word in document memory R6. If "yes" in step P60 and if it is detected in step P61 that the error detection flag in flag register R1 is set at "0", then a word in the word area specified by input position Cp is read out and the spelling-checking operation for the word is effected in step P62.

After this, if it is detected in step P63 that information of misspelling is transmitted from spelling-checking unit 27, buzzer 24 is activated in step P64 to generate sound for a short period of time and the error detection flag is set to "1" in step P65, and step P1 is effected.

If it is detected in step P63 that the checked word is correctly spelled, step P66 is effected. In step P63, the CR code is stored into an area specified by input position Cp so as to perform the carriage return operation with respect to sentence data in document memory R6. Then, the error detection flag is set to "0" in step P67 and step P1 shown in FIG. 19A is effected again.

If it is detected in step P61 that the error detection flag has already been set at "1", it is determined that the carriage return key operation detected in step P7 is effected to divide the wrong word into two correct words by the CR code, and step P66 is effected.

If it is detected in step P60 that input position Cp is not set in a word area, it is determined that carriage return key operation is effected to insert the CR code for the carriage return at the punctuation of the sentence, thus performing ordinary editing operation, and step P66 is effected to store the CR code into a location specified by input position Cp.

If it is detected in step P60 that the spelling-checking flag is set at "0" step P66 is effected.

With the electronic typewriter having the spelling-checking function as described above, the operation mode is set to the "storing" mode by operating a combination of mode key 14 and numeral key 11-4 after the turn-on of the power source switch and before the starting of the typing operation. Then, character keys of keyboard 2 such as alphabet keys 10 and numeral keys 11 and space key 12 are sequentially operated to enter sentences. The input data thus entered is displayed on display 9 for a preset period of time and is then sequentially stored in document memory R6. In the process of entering sentences, each time space key 12 is operated after the character key operation for one word is completed, the spelling of the word entered immediately before the space key operation is checked. Only when the word is detected to be misspelled, an alarm sound is generated from buzzer 24. When the operator hears the buzzer sound, the operator operates back space key 34, for example, to move input position Cp (position of cursor 60) back to the error character position, operates correction key 36 to erase the error character, and then operates the character key to type a correct character in a corresponding position.

After a series of sentence input operations is completed, the operation mode is set to "editing" mode by operating a combination of mode key 14 and numeral key 11-5. Then, forward key 35 is operated to sequentially display character data 59a, space code 59b and CR code 59c stored in document memory R6 on 25-digit display 9.

In a case where a word or sentence displayed is re-written by operating the correction and character keys, and if input position Cp (position of cursor 60) is set on the right side of the corrected word immediately after the correction operation, then the spelling-checking for the corrected word is effected.

When the operator corrects the wrong character of a word which has been detected to be misspelled in the spelling-checking operation, input position Cp is set on the corrected word. In this case, if the carriage return key is operated, the spelling of the corrected word is checked, and if the word is detected to be correctly spelled, input position Cp (position of cursor 60) is set on the right position of the checked word. Thus, when the spelling of word is checked, it is not necessary to operate keys for the purpose of setting input position Cp on the right position of the word to be checked.

When the word is detected to be misspelled, buzzer 24 is activated to generate alarm sound. In this case, input position Cp is not moved. Therefore, at this time, the operation can easily correct the word.

Further, in a case where two words are continuously input without having the space code or CR code provided therebetween, the continuous word is determined as a word and detected to be misspelled. In this case, the CR code is set into a location specified by input position Cp so as to divide the continuous word into two words, thus providing two correct words. Therefore, the CR code can be forcedly entered for the purpose of carriage return operation by operating the carriage return key again so as to eliminate the misspelled word.

As described above, in the "editing" mode, if a word or sentence is corrected, the spelling of the corrected word is automatically checked. Therefore, the misspelling of a word occurring after the word or sentence is corrected can be easily corrected at a high reliability.

What is claimed is:

1. An electronic typewriter comprising:
a printing head;
a carriage on which said printing head is mounted and movable to sequential printing positions located along a printing line;
a carriage pointer means for indicating at which of said sequential printing positions the carriage is located;
a buffer memory including sequentially-accessed memory locations corresponding, respectively, to said sequential printing positions;
a keyboard including a plurality of character keys and at least one carriage-movement control key;
processing means for performing a processing operation when any one of the plurality of character keys is operated, in which said processing operation (a) a character code representing a character on a character key that has been operated is stored into a memory location of said buffer memory corresponding to the printing position then indicated by said carriage pointer means, (b) said printing head is driven to print a character represented by a character code corresponding to the operated character key, and (c) said carriage is moved forward to the next printing position, wherein a word stored in said buffer memory includes an uninterrupted sequence of character codes at least one character code in length in said sequentially-accessed memory locations;
means for identifying a particular word stored in said buffer memory as a word for which the at least one character code thereof was stored corresponding to at least one printing position passed by said carriage immediately before a printing position specified by the carriage pointer means when said carriage-movement control key is operated;
spell-checking means for checking the spelling of said particular word and providing an indication as to whether a spelling error has been detected;
monitoring means for providing an output signal indicative of whether a detected spelling error has been corrected; and
control means for (a) if no spelling error in said particular word is detected by said spell checking means, moving said carriage to a predetermined position selected by operation of a carriage-movement control key, (b) if a spelling error in the particular word is detected by the spell checking means, inhibiting movement of said carriage to said predetermined position in response to first operation of said carriage-movement control key and, if said monitoring means indicates that the detected spelling error is not corrected, moving said carriage to said predetermined position in response to further operation of said carriage-movement control key.

2. The electronic typewriter of claim 1, wherein said carriage-movement control key is a carriage return key, and said predetermined position is a home position at a beginning of said printing line.

3. The electronic typewriter of claim 1, wherein said carriage movement control key is a tab key, and said predetermined position is a preselected tab setting which immediately follows the printing position indicated by said carriage pointer means when said tab key is operated.

4. The electronic typewriter of claim 1, wherein said control means comprises means for detecting when the carriage is within a hot zone located relative to a last printing position along said printing line, said control means responding to operation of a space key as said carriage-movement control key when the carriage is within said hot zone, and wherein said predetermined position is a home position at a beginning of said printing line.

5. The electronic typewriter of claim 1, wherein said monitoring means comprises an error detection flag register in which a flag is set in response to an indication from said spell checking means that a spelling error has been detected, and wherein said control means determines, in response to operation of said carriage-movement control key and before said spell checking means checks the spelling of said particular word, whether said register has its flag set so that;
 (a) if said flag is set, operation of said carriage-movement control key moves said carriage to said predetermined position, and said flag is reset, and
 (b) if said flag is not set, said control means activates said spell checking means to check the spelling of said particular word, and then
  (1) if a spelling error is detected, setting said flag and inhibiting movement of said carriage to said predetermined position, or
  (2) if no spelling error is detected, resetting said flag and moving said carriage to said predetermined position.

6. An electronic typewriter comprising:
 a printing head;
 means for moving the printing head to sequential printing positions along a printing line;
 a keyboard including a plurality of character keys, and at least one control key;
 memory means for storing character codes corresponding respectively to operated ones of said character keys;
 means for identifying a word consisting of at least one character code stored in said memory means and corresponding to an uninterrupted sequence of printing positions at which character keys were operated;
 spell checking means for checking the spelling of a word stored in said memory means;
 control means responsive to operation of a control key for (a) activating said spell checking means for a particular word in printing positions immediately before a printing position at which said control key is activated, (b) if a spelling error is not detected, activating said moving means to move said printing head to a predetermined position, and (c) if a spelling error is detected, inhibiting movement of said printing head to said predetermined position, and said control means is responsive to further operation of said control key after detection of a spelling error which remains uncorrected to move said printing head to said predetermined position.

7. The electronic typewriter of claim 6, wherein said control means is responsive to said further operation of said control key when the printing head is located at a printing position corresponding to one where a character key of said particular word was operated.

8. An electronic typewriter comprising:
 a printing head;
 means for moving the printing head to sequential printing positions along a printing line;
 a keyboard including a plurality of character keys, and at least one control key;
 memory means for storing character codes corresponding respectively to operated ones of said character keys;
 means for identifying a word consisting of at least one character code stored in said memory means and corresponding to an uninterrupted sequence of printing positions at which character keys were operated;
 spell checking means for checking the spelling of a word stored in said memory means;
 control means responsive to operation of a control key for (a) activating said spell checking means for a particular word in printing positions immediately before a printing position at which said control key is activated, (b) if a spelling error is not detected, activating said moving means to move said printing head to a predetermined position, and (c) if a spelling error is detected, inhibiting movement of said printing head to said predetermined position, and said control means is responsive to further operation of said control key to activate said spell checking means for said particular word.

9. The electronic typewriter of claim 8, wherein said control means is responsive to said further operation of said control key when the printing head is located at a printing position corresponding to one where a character key of said particular word was operated.

10. A method for controlling an electronic typewriter having a printing head, a carriage on which said printing head is mounted and movable to sequential printing positions located along a printing line, a carriage pointer means for indicating at which of said sequential printing positions the carriage is located, a buffer memory including sequentially-accessed memory locations corresponding, respectively, to said sequential printing positions, and a keyboard including a plurality of character keys and at least one carriage-movement control key, such method comprising the step of:
 performing a processing operation when any one of the plurality of character keys is operated, in which said processing (a) a character code representing a character on a character key that has been operated is stored into a memory location of said buffer memory corresponding to the printing position then indicated by said carriage pointer means, (b) said printing head is driven to print a character represented by a character code corresponding to the operated character key, and (c) said carriage is moved forward to the next printing position, wherein a word stored in said buffer memory includes an uninterrupted sequence of character codes at least one character code in length in said sequentially-accessed memory locations;
 identifying a particular word stored in said buffer memory as a word for which the at least one character code thereof was stored corresponding to at least one printing position passed by said carriage immediately before a printing position specified by the carriage pointer means when said carriage-movement control key is operated;
 checking the spelling of said particular word and providing an indication as to whether a spelling error has been detected;
 providing an output signal indicative of whether a detected spelling error has been corrected; and
 controlling the electronic typewriter such that (a) if no spelling error in said particular word is detected, moving said carriage to a predetermined position selected by operation of a carriage-movement control key, (b) if a spelling error in the particular word is detected, inhibiting movement of said carriage to said predetermined position in response to first operation of said carriage-movement control key and, if said output signal providing step indicates that the detected spelling error is not corrected, moving said carriage to said predetermined position in response to further operation of said carriage-movement control key.

11. The method for controlling an electronic typewriter of claim 10, wherein said carriage-movement control key is a carriage return key, and said predetermined position is a home position at a beginning of said printing line.

12. The method for controlling an electronic typewriter of claim 10, wherein said carriage movement control key is a tab key, and said predetermined position is a preselected tab setting which immediately follows the printing position indicated by said carriage pointer means when said tab key is operated.

13. The method for controlling an electronic typewriter of claim 10, wherein said controlling step includes detecting when the carriage is within a hot zone located relative to a last printing position along said printing line, responding to operation of a space key as said carriage-movement control key when the carriage is within said hot zone, and wherein said predetermined position is a home position at a beginning of said printing line.

14. The method for controlling an electronic typewriter of claim 10, wherein said output signal providing step includes setting a flag in an error detection flag register in response to an indication obtained in the spelling checking step that a spelling error has been detected, and wherein said controlling step includes determining, in response to operation of said carriage-movement control key and before said spelling checking step checks the spelling of said particular word, whether said register has its flag set so that:
 (a) if said flag is set, operation of said carriage-movement control key moves said carriage to said predetermined position, and said flag is reset, and
 (b) if said flag is not set, said control means activates said spell checking means to check the spelling of said particular word, and then
  (1) if a spelling error is detected, setting said flag and inhibiting movement of said carriage to said predetermined position, or
  (2) if no spelling error is detected, resetting said flag and moving said carriage to said predetermined position.

15. A method for controlling an electronic typewriter having a printing head, means for moving the printing head to sequential printing positions along a printing line, and a keyboard including a plurality of character keys and at least one control key, such method comprising the steps of:
 storing character codes corresponding respectively to operated ones of said character keys;
 identifying a word consisting of at least one stored character code and corresponding to an uninterrupted sequence of printing positions at which character keys were operated;
 checking the spelling of a stored word;
 controlling said electronic typewriter responsive to operation of a control key by (a) performing said spelling checking step for a particular word in printing positions immediately before a printing position at which said control key is activated, (b) if a spelling error is not detected, activating said moving means to move said printing head to a predetermined position, and (c) if a spelling error is detected, inhibiting movement of said printing head to said predetermined position, and controlling said electronic typewriter responsive to further operation of said control key after detection of a spelling error which remains uncorrected to move said printing head to said predetermined position.

16. The method for controlling an electronic typewriter of claim 15, wherein said controlling step is performed responsive to said further operation of said control key when the printing head is located at a printing position corresponding to one where a character key of said particular word was operated.

17. A method for controlling an electronic typewriter having a printing head, means for moving the printing head to sequential printing positions along a printing line, and a keyboard including a plurality of character keys and at least one control key, such method comprising the steps of:
 storing character codes corresponding respectively to operated ones of said character keys;
 identifying a word consisting of at least one stored character code and corresponding to an uninterrupted sequence of printing positions at which character keys were operated;
 checking the spelling of a word stored in said memory means;
 controlling the electronic typewriter responsive to operation of a control key for (a) performing said spelling checking step for a particular word in printing positions immediately before a printing position at which said control key is activated, (b) if a spelling error is not detected, activating said moving means to move said printing head to a predetermined position, and (c) if a spelling error is detected, inhibiting movement of said printing head to said predetermined position, and controlling said electronic typewriter responsive to further operation of said control key to activate said spelling checking step for said particular word.

18. The method for controlling an electronic typewriter of claim 17, wherein said controlling step is performed responsive to said further operation of said control key when the printing head is located at a printing position corresponding to one where a character key of said particular word was operated.

* * * * *